US012424052B2

(12) United States Patent
Turner

(10) Patent No.: US 12,424,052 B2
(45) Date of Patent: Sep. 23, 2025

(54) GAMING SYSTEMS AND METHODS USING ROAMING GAME ELEMENTS

(71) Applicant: LNW Gaming, Inc., Las Vegas, NV (US)

(72) Inventor: Craig Turner, Leeds (GB)

(73) Assignee: LNW Gaming, Inc., Las Vegas, NV (US)

( * ) Notice: Subject to any disclaimer, the term of this patent is extended or adjusted under 35 U.S.C. 154(b) by 282 days.

(21) Appl. No.: 17/978,351

(22) Filed: Nov. 1, 2022

(65) Prior Publication Data

US 2024/0144771 A1 May 2, 2024

(51) Int. Cl.
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
CPC ... G07F 17/3213; G07F 17/3267; G07F 17/34
USPC .......................................................... 463/20
See application file for complete search history.

(56) References Cited

U.S. PATENT DOCUMENTS

| | | | |
|---|---|---|---|
| 3,733,075 | A | 5/1973 | Burnside et al. |
| 5,342,047 | A | 8/1994 | Heidel et al. |
| 5,356,140 | A | 10/1994 | Dabrowski et al. |
| 5,393,061 | A | 2/1995 | Manship et al. |
| 5,704,835 | A | 1/1998 | Dietz |
| 5,833,537 | A | 11/1998 | Barrie |
| 5,951,397 | A | 9/1999 | Dickinson |
| 6,027,115 | A | 2/2000 | Griswold et al. |
| 6,056,642 | A | 5/2000 | Bennett |
| 6,089,977 | A | 7/2000 | Bennett |

(Continued)

FOREIGN PATENT DOCUMENTS

| | | | |
|---|---|---|---|
| AU | 2015210489 | A1 | 2/2016 |
| GB | 2097160 | B | 5/1984 |

(Continued)

OTHER PUBLICATIONS

Zodiac Lion Class III Slot Game; IGT; Casino Journal, Mar. 5, 2020.

(Continued)

*Primary Examiner* — Allen Chan

(57) ABSTRACT

A gaming system configured to present game outcomes by populating symbol positions with a respective plurality of symbols, activate, in response to a trigger event, an accumulator symbol having an active duration, define, for each game outcome with the accumulator symbol active, an award region relative to a current position of the accumulator symbol, advance, for each subsequent game outcome, the accumulator symbol to a next symbol position different from a previous symbol position occupied by the accumulator symbol in an immediately prior game outcome, update, in response to a value-bearing symbol occupying the award region, award indicia of the accumulator symbol at least partially as a function of the award value associated with the value-bearing symbol, remove, in response to the active duration concluding, the accumulator symbol and present an award indicated by the award indicia of the removed accumulator symbol.

21 Claims, 11 Drawing Sheets

(56) References Cited

U.S. PATENT DOCUMENTS

| | | | |
|---|---|---|---|
| 6,224,482 B1 | 5/2001 | Bennett | |
| 6,251,013 B1 | 6/2001 | Bennett | |
| 6,270,411 B1 | 8/2001 | Gura et al. | |
| 6,290,600 B1 | 9/2001 | Glasson | |
| 6,517,432 B1 | 2/2003 | Jaffe | |
| 6,551,187 B1 | 4/2003 | Jaffe | |
| 6,561,900 B1 | 5/2003 | Baerlocher et al. | |
| 6,572,472 B1 * | 6/2003 | Glavich | G07F 17/3267 463/16 |
| 6,641,477 B1 | 11/2003 | Dietz | |
| 6,657,923 B2 | 12/2003 | Laughlin | |
| 6,731,313 B1 | 5/2004 | Kaminkow | |
| 6,786,818 B1 | 9/2004 | Rothschild et al. | |
| 6,837,790 B1 | 1/2005 | Kaminkow | |
| 6,910,962 B2 | 6/2005 | Marks et al. | |
| 7,018,293 B2 | 3/2006 | Brown et al. | |
| 7,029,396 B2 | 4/2006 | Jaffe et al. | |
| 7,121,945 B2 | 10/2006 | Suganuma et al. | |
| 7,179,169 B2 | 2/2007 | Beaulieu et al. | |
| 7,252,591 B2 | 8/2007 | Van Asdale | |
| 7,338,367 B2 * | 3/2008 | Kaminkow | G07F 17/34 463/16 |
| 7,458,890 B2 | 12/2008 | Loose et al. | |
| 7,503,847 B2 | 3/2009 | Baerlocher | |
| 7,553,231 B2 | 6/2009 | Rodgers et al. | |
| 7,604,538 B2 | 10/2009 | Pacey | |
| 7,980,936 B2 | 7/2011 | Mead | |
| 8,083,581 B2 | 12/2011 | Marks et al. | |
| 8,105,151 B2 | 1/2012 | Caputo et al. | |
| 8,162,741 B2 | 4/2012 | Wadleigh et al. | |
| 8,192,275 B2 | 6/2012 | Aoki et al. | |
| 8,287,357 B2 | 10/2012 | Evans | |
| 8,323,091 B2 | 12/2012 | Frank et al. | |
| 8,357,041 B1 | 1/2013 | Saunders | |
| 8,360,851 B2 | 1/2013 | Aoki et al. | |
| 8,366,538 B1 | 2/2013 | Saunders et al. | |
| 8,371,930 B1 | 2/2013 | Saunders et al. | |
| 8,414,380 B2 | 4/2013 | Saunders et al. | |
| 8,465,358 B2 | 6/2013 | Kemper | |
| 8,496,522 B2 | 7/2013 | Caputo et al. | |
| 8,512,138 B2 | 8/2013 | Saunders | |
| 8,523,659 B2 | 9/2013 | Evans | |
| 8,574,059 B2 | 11/2013 | Rodgers et al. | |
| 8,608,545 B2 | 12/2013 | Arora et al. | |
| 8,662,986 B2 | 3/2014 | Rodgers et al. | |
| 8,690,660 B2 | 4/2014 | Saunders et al. | |
| 8,696,434 B2 | 4/2014 | Tsukahara | |
| 8,790,169 B2 | 7/2014 | Saunders | |
| 8,851,974 B2 | 10/2014 | Caputo et al. | |
| 8,870,642 B2 | 10/2014 | Leupp et al. | |
| 8,882,578 B2 | 11/2014 | Saunders | |
| 8,961,291 B2 | 2/2015 | Dias Pires et al. | |
| 9,005,022 B2 | 4/2015 | Saunders | |
| 9,165,433 B2 | 10/2015 | Caputo | |
| 9,202,345 B2 | 12/2015 | Zoltewicz et al. | |
| 9,230,410 B2 | 1/2016 | Saunders et al. | |
| 9,245,421 B2 | 1/2016 | Saunders et al. | |
| 9,251,667 B2 | 2/2016 | Marks et al. | |
| 9,257,017 B2 | 2/2016 | Saunders et al. | |
| 9,262,895 B2 | 2/2016 | Rodgers et al. | |
| 9,275,524 B2 | 3/2016 | Nicely | |
| 9,299,224 B2 | 3/2016 | Leupp | |
| 9,311,781 B2 | 4/2016 | Edwards | |
| 9,349,251 B2 | 5/2016 | Caputo et al. | |
| 9,355,528 B2 | 5/2016 | Nicely | |
| 9,418,521 B1 | 8/2016 | Henrick et al. | |
| 9,424,720 B2 | 8/2016 | Suda | |
| 9,430,900 B2 | 8/2016 | Zoltewicz et al. | |
| 9,466,169 B2 | 10/2016 | Basallo et al. | |
| 9,633,506 B2 | 4/2017 | Basallo et al. | |
| 9,916,719 B2 * | 3/2018 | Hawkins | G07F 17/3213 |
| 9,928,691 B2 | 3/2018 | Olive | |
| 10,013,855 B2 | 7/2018 | Nakamura | |
| 10,037,651 B2 | 7/2018 | You et al. | |
| 10,043,350 B2 | 8/2018 | Gomez et al. | |
| 10,204,473 B2 | 2/2019 | Lenger | |
| 10,339,761 B2 | 7/2019 | Olive | |
| 10,366,575 B2 | 7/2019 | Visser | |
| 10,388,112 B2 | 8/2019 | You et al. | |
| 10,417,877 B2 | 9/2019 | Gomez et al. | |
| 10,475,294 B2 | 11/2019 | Gomez et al. | |
| 10,643,431 B2 | 5/2020 | Chesworth et al. | |
| 10,672,220 B2 | 6/2020 | Lenger | |
| 10,706,664 B2 | 7/2020 | Boese et al. | |
| 10,769,888 B2 | 9/2020 | You et al. | |
| 2002/0119818 A1 | 8/2002 | Savio et al. | |
| 2003/0022712 A1 * | 1/2003 | Locke | G07F 17/3211 463/20 |
| 2003/0035346 A1 | 2/2003 | Laughlin | |
| 2003/0130034 A1 | 7/2003 | Suganuma et al. | |
| 2003/0157980 A1 | 8/2003 | Loose et al. | |
| 2003/0216165 A1 | 11/2003 | Singer et al. | |
| 2004/0023714 A1 | 2/2004 | Asdale | |
| 2004/0043815 A1 | 3/2004 | Kaminkow | |
| 2004/0137982 A1 | 7/2004 | Cuddy et al. | |
| 2004/0171417 A1 | 9/2004 | Beaulieu et al. | |
| 2006/0189369 A1 | 8/2006 | Taylor | |
| 2007/0060248 A1 | 3/2007 | Rodgers et al. | |
| 2007/0060275 A1 | 3/2007 | Gilmore et al. | |
| 2007/0129135 A1 | 6/2007 | Marks et al. | |
| 2008/0003278 A1 | 1/2008 | Mondelo | |
| 2008/0004532 A1 | 1/2008 | Rubey et al. | |
| 2008/0032784 A1 | 2/2008 | Englman | |
| 2008/0045298 A1 | 2/2008 | Yoshizawa | |
| 2008/0045320 A1 | 2/2008 | Kato | |
| 2008/0051188 A1 * | 2/2008 | Inamura | G07F 17/3286 463/20 |
| 2008/0108431 A1 | 5/2008 | Cuddy et al. | |
| 2009/0239634 A1 | 9/2009 | Nguyen | |
| 2009/0291741 A1 | 11/2009 | Schofield | |
| 2010/0075737 A1 | 3/2010 | Bluemel | |
| 2010/0167815 A1 | 7/2010 | Gagner et al. | |
| 2010/0234092 A1 | 9/2010 | Gomez et al. | |
| 2010/0304832 A1 | 12/2010 | Kup-Ferroth | |
| 2012/0122532 A1 | 5/2012 | Berman et al. | |
| 2012/0178517 A1 | 7/2012 | Montenegro et al. | |
| 2013/0331167 A1 * | 12/2013 | Meistrich | G07F 17/34 463/20 |
| 2014/0014186 A1 | 1/2014 | Bhattacharya et al. | |
| 2014/0141860 A1 | 5/2014 | Meyer | |
| 2014/0179396 A1 | 6/2014 | Aoki et al. | |
| 2014/0274288 A1 * | 9/2014 | Hornik | G07F 17/326 463/20 |
| 2014/0274292 A1 | 9/2014 | Suda | |
| 2014/0323198 A1 | 10/2014 | Tuck | |
| 2015/0031437 A1 | 1/2015 | Gomez et al. | |
| 2015/0170462 A1 | 6/2015 | Berman et al. | |
| 2015/0269809 A1 | 9/2015 | Smith | |
| 2015/0287269 A1 | 10/2015 | Berman | |
| 2015/0356833 A1 | 12/2015 | Aoki et al. | |
| 2016/0042597 A1 | 2/2016 | Olive | |
| 2017/0154498 A1 | 6/2017 | Olive | |
| 2018/0268655 A1 | 9/2018 | Olive | |
| 2018/0268659 A1 | 9/2018 | Chesworth et al. | |
| 2019/0236905 A1 | 8/2019 | Washington et al. | |
| 2019/0340880 A1 | 11/2019 | You et al. | |
| 2020/0279457 A1 | 9/2020 | Chesworth et al. | |
| 2020/0364982 A1 | 11/2020 | You et al. | |

FOREIGN PATENT DOCUMENTS

| | | |
|---|---|---|
| GB | 2144568 B | 9/1985 |
| GB | 2251112 A | 6/1992 |

OTHER PUBLICATIONS

Zodiac Lion Slot Machine Snapshots from YouTube Video posted Aug. 15, 2019.
Reel Heist, Red Tiger, Retrieved from: https://www.redtiger.com/games/reel-heist, 8 pages.

* cited by examiner

GAMING SYSTEMS AND METHODS USING ROAMING GAME ELEMENTS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a moving accumulator symbol feature and game features having a dynamic duration.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they, can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly and game-logic circuitry that are configured to present game outcomes by populating symbol positions with a respective plurality of symbols, activate, in response to a trigger event, an accumulator symbol having an active duration and that remains within the symbol positions while active, define, for each game outcome with the accumulator symbol active, an award region relative to a current position of the accumulator symbol and including less than all of the symbol positions, advance, for each subsequent game outcome, the accumulator symbol to a next symbol position different from a previous symbol position occupied by the accumulator symbol in an immediately prior game outcome, update, in response to a value-bearing symbol occupying the award region, award indicia of the accumulator symbol at least partially as a function of the award value associated with the value-bearing symbol, remove, in response to the active duration concluding, the accumulator symbol and present an award indicated by the award indicia of the removed accumulator symbol.

Additional aspects of the invention will be apparent to those of ordinary skill in the art in view of the detailed description of various embodiments, which is made with reference to the drawings, a brief description of which is provided below.

Figure 1:
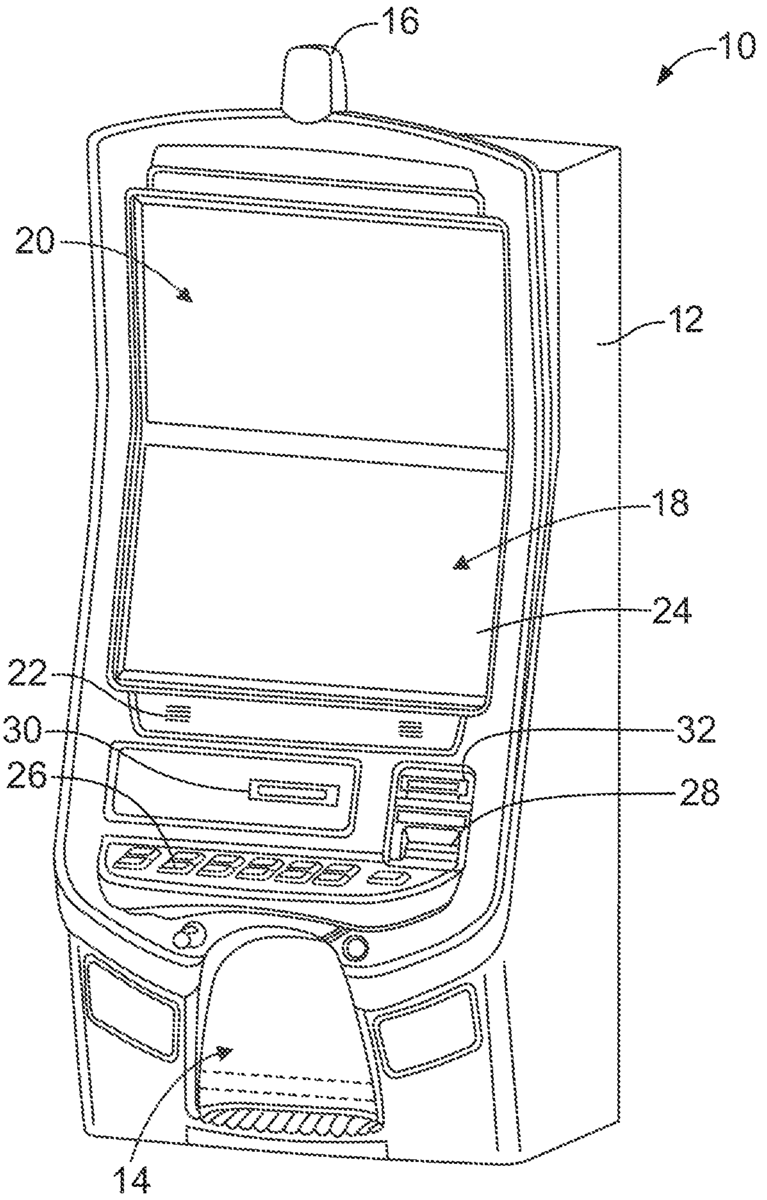
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct a presentation assembly to present roaming accumulator symbol animation in combination with a symbol-value collection, selection, and award process that minimizes processing overhead by utilizing numbered indicia to represent credit values instead of complex, fanciful game images. Further, the process collects displayed values borne by special symbols (i.e., value-bearing symbols) through the use of an animated roaming accumulator based on a dynamic award region associated with the accumulator symbol according to stored, variable criteria. In this way, the value-bearing symbols and accumulator symbols provide building blocks for innumerable different collection and selection sequences simply by manipulating the criteria associated with the value-bearing symbols and accumulator symbols, resulting in fewer rules needed for the award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the credits meter, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
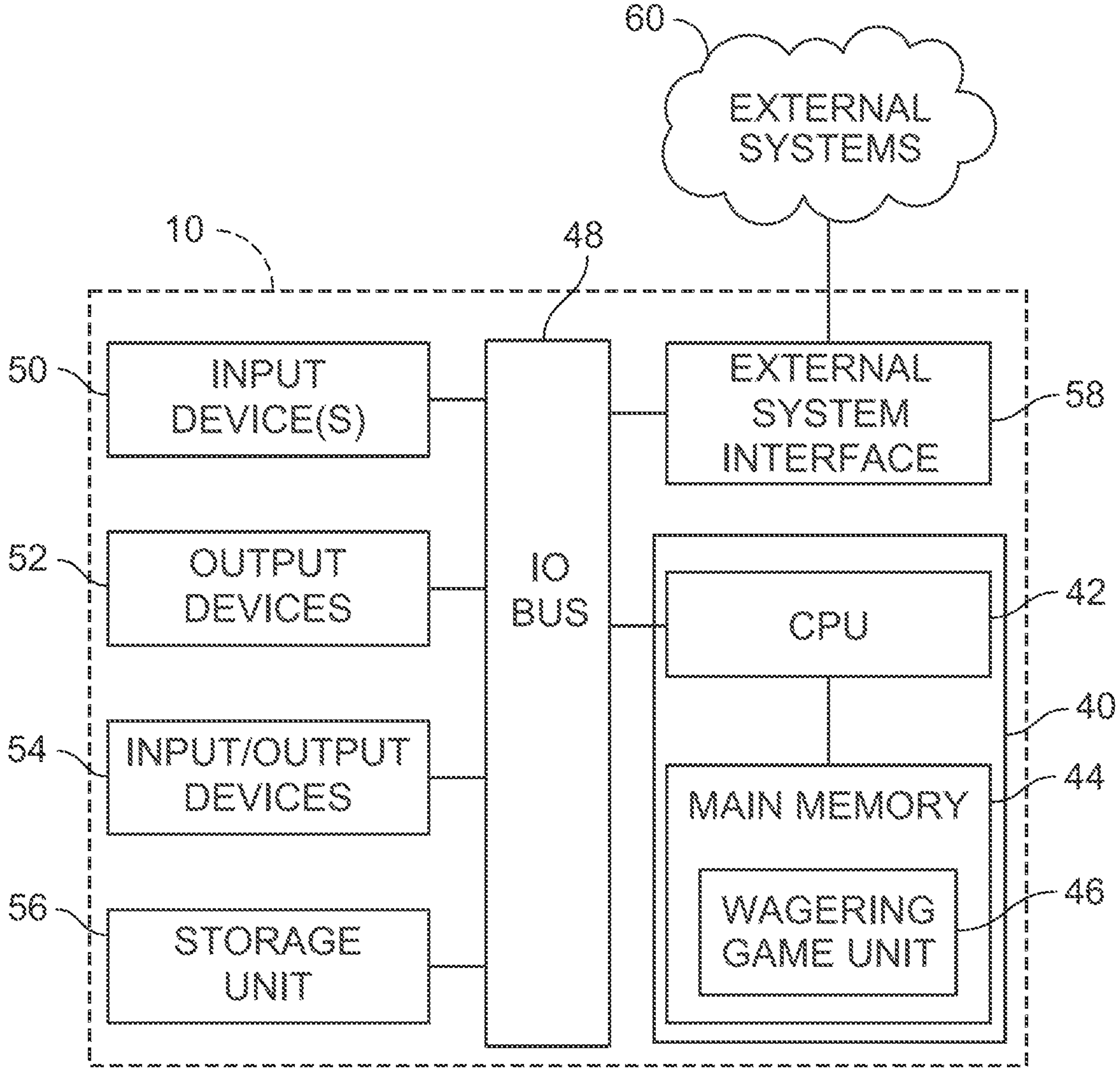
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

Figure 3:
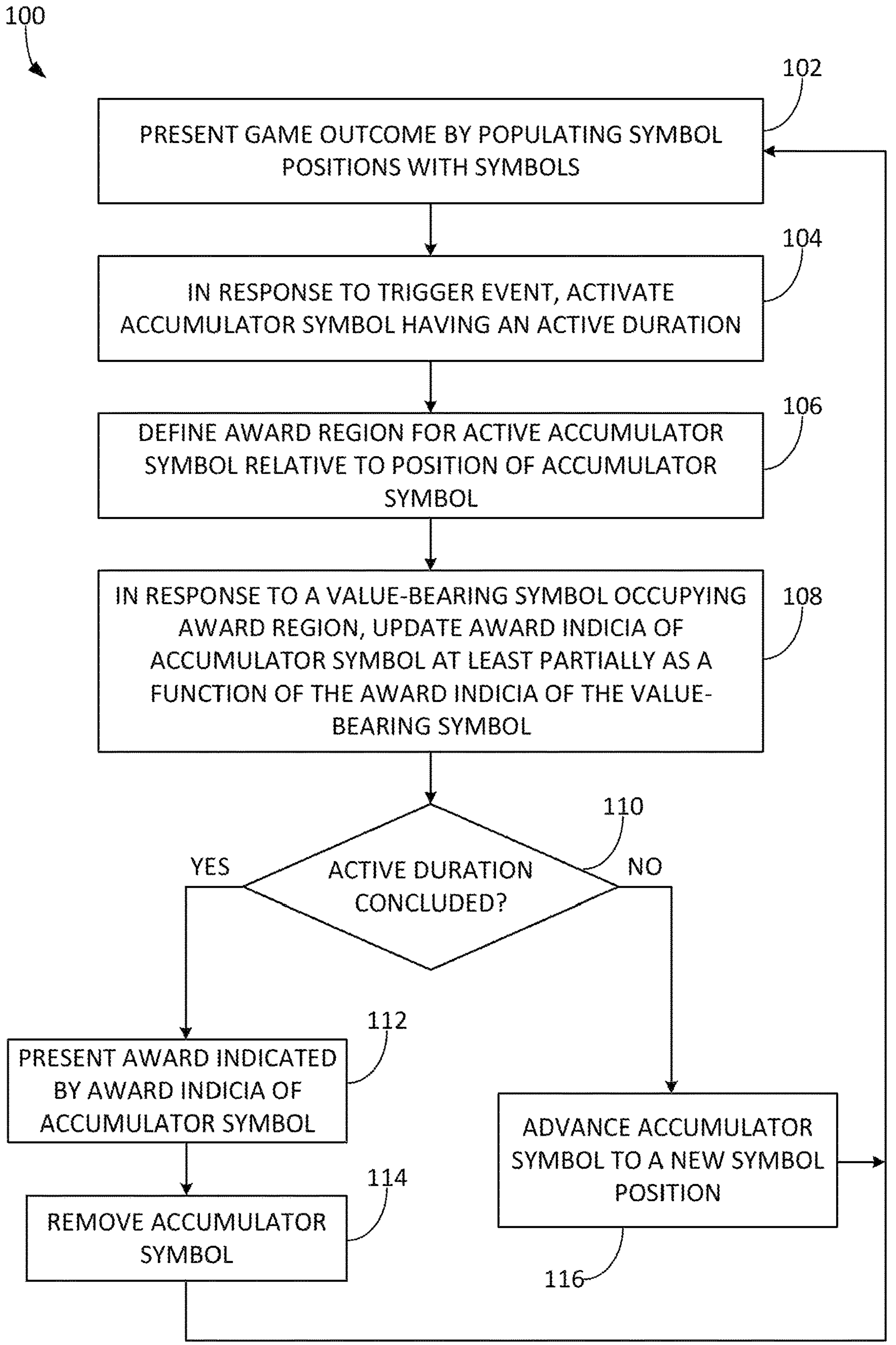
FIG. 3 is a flow diagram of an example method for conducting and presenting a game feature using a gaming system, according to an embodiment of the present invention.

FIG. 3 depicts a flow diagram of an example method 100 for providing a game feature using a gaming system, such as the gaming systems shown in FIGS. 1 and 2. The method 100 is performed using a presentation assembly of a gaming machine and game-logic circuitry in communication with the presentation assembly. The presentation assembly may include one or more displays and/or other suitable devices configured for presentation of the game feature (e.g., lighting assemblies, speakers, etc.). The game-logic circuitry may be at least partially integrated within the gaming machine and/or partially located within an external device in communication with the gaming machine, such as one or more servers. In other embodiments, the method 100 may include additional, fewer, or alternative steps and/or be performed by a different configuration of devices, including those steps and configurations described elsewhere herein.

Prior to the steps of the method 100, the game feature is initiated. The game feature is included within a game having one or more game features. For example, the game may include a base game feature and one or more bonus game features. The base game feature is the default game feature in which a gaming session at the gaming machine is initiated. The bonus game feature is a game feature that is triggered by one or more game events and/or conditions (e.g., within the base game feature) and has a limited duration. In response to the duration concluding, the bonus game feature is terminated and the game returns to another game feature, such as the base game feature. In at least some embodiments, the base game feature and the bonus game feature may share one or more game functions and/or presentations. That is, while the game features readily distinguishable by the player, the shared aspects of the game features may facilitate seamless transition between the game features.

In the example embodiment, the game feature associated with the method 100 is a bonus game feature. That is, the game feature is initiated in response to a bonus game trigger being detected by the game-logic circuitry within a base game feature. The bonus game feature includes a number of free spins or game outcomes in which no wager is needed to generate the outcomes. The number of free spins remaining or that have been generated may be presented on an interface of the presentation assembly. In some embodiments, the duration of the bonus game feature may be dynamic and responsive to game events or conditions detected within the bonus game feature. In other embodiments, the duration of the bonus game feature is static. In certain embodiments, the duration of the bonus game feature is not defined by game outcomes, but rather may be defined by other game events, such as the presence or absence of certain symbols in the game outcome. In further embodiments, the duration is defined by a plurality of game parameters, such as game outcomes, certain symbols, certain winning outcomes, and the like. At the conclusion of the bonus game feature, the game returns to a base game feature.

In other embodiments, the game feature associated with the method 100 is a base game feature. The base game feature may be initiated when the player initiates the gaming session at the gaming machine. That is, to initiate the gaming session and the base game feature, the player provides credit input to the gaming machine. The credit input may include, for example, one or more physical credit inputs (e.g., coins, bills, cards, tickets, etc.) that are provided to credit input devices configured to receive the physical credit input and extract a corresponding credit value, such as determining a monetary value of deposited bills and coins or accessing a stored amount of credits from an accounting server using an identifier extracted from a ticket or card. In another example, the credit input is provided by linking the gaming session to an account or digital wallet of the player to access player funds. The gaming session may be linked by providing one or more player identifiers, passwords, and the like via a physical item (e.g., a player card), inputting the credentials into the gaming machine directly, linking a player computing device (e.g., a smartphone) to the gaming machine and/or other device in communication with the gaming machine, and the like.

In response to providing the credit input, a credit balance is established. The credit balance is used to fund play of the game. That is, wagers are decremented from the credit balance, and credit awards are applied to the credit balance. One or more credit meters may be presented on the interfaces of the presentation assembly to enable the player to visibly monitor the credit balance. It is to be understood that the credit balance (and the corresponding credits) may have monetary value or a non-monetary value (i.e., non-monetary credits are not bidirectionally exchangeable with monetary credit inputs). The credit balance may be uniquely associated with the game or player account such that the credit balance at the end of a gaming session is stored for a subsequent gaming session, or the credit balance is usable in other games or other uses, such as an exchange with monetary funds. In such embodiments with a credit balance usable in manners beyond the game, terminating the gaming session may include outputting a credit output (e.g., coins, bills, tickets, cards, etc.) corresponding to the remaining credit balance.

In certain embodiments, the method 100 may be associated with a plurality of game features. For example, the base game feature and the bonus game feature may share at least one or more steps of the method 100. The method 100 may be adapted to fit the unlimited nature of the base game feature and/or provide an enhanced version of the steps for the bonus game feature to provide awards with an increased frequency and/or amount. It is to be understood that adapting the game feature to the manner in which the game feature is implemented within a game is considered to be within the spirit and scope of the present disclosure.

In the example embodiment, the game feature is presented within a game interface including a plurality of symbol positions. The symbol positions are configured to be selectively occupied by a respective symbol as described herein. The symbol positions are arranged into one or more symbols arrays, where each symbol array organizes the symbol positions into rows and columns. In other embodiments, the symbol positions are not arranged into symbol arrays, or the symbols described herein are randomly selected and presented via other suitable means beyond symbol positions.

Although the game feature as described herein is focused on the use of symbols and symbol positions, other game elements may be used and presented in the game interface associated with the game feature. For example, game elements external to the symbol positions, such as an award or multiplier wheel, may be used within the game feature to perform supplemental functions within the game feature and/or to perform the functions described herein with respect to the symbols and symbol positions.

In the example embodiment, the bonus game feature is initiated with a predefined number of free spins (e.g., ten spins) or game outcomes. In other embodiments, the number of free spins is dynamic and may be at least partially random and/or based on the bonus trigger event that caused the bonus game feature to be initiated. When the game feature is initiated, the game-logic circuitry is configured to generate a game outcome at step 102 and cause the presentation assembly to present the game outcome. More specifically, the game-logic circuitry randomly selects symbols to populate the symbol positions and causes the presentation assembly to present one or more presentation elements and animations associated with the game outcome. The symbols are selected from one or more sets of available symbols stored by the game-logic circuitry. In one example, the sets of available symbols are symbol-bearing reel strips, where each reel strip is associated with one or more respective symbol position (e.g., one reel strip is associated with one row or column of the symbol array).

The symbol selections are based on one or more random values or determines (e.g., by the random number generator). In at least some embodiments, the symbol selections are further based on one or more weight parameters, where the weight parameters increase or decrease the probability of selecting one symbol or reel stop position over another symbol or reel stop position. In one example, the symbols or reel stop positions of each set of available symbols is stored in a weighted table, where each symbol or reel stop position is associated with a range of values. Symbols with a relatively higher probability are associated with a larger range of values. To generate the game outcome, one or more random values are compared to the values of the weighted tables. The symbols or reel stop positions associated with the values matching the random values are selected for the game outcome.

The presentation assembly is configured to present the game outcome in a manner that readily indicates to a player that a game outcome has been determined. For example, for reel-based symbol population, the game outcome is presented by animating the reel strip to spin and stop on the symbols included in the game outcome. Other suitable presentation elements and animations may be additionally or alternatively presented by the presentation assembly for the game outcome. For example, additional presentation may be performed for one or more game determinations performed by the game-logic circuitry based on the game outcome.

In response to generating the game outcome, the game-logic circuitry is configured to perform one or more game outcome determinations. That is, the game-logic circuitry stores predefined rules for analyzing the symbols of the game outcome, including the type of symbol, relative position of the symbol state of the symbol, and the like, to determine if a winning outcome, trigger event, and/or other suitable game event or condition is detected. It is to be understood that game determinations beyond the method 100 may be performed in combination with the determinations described herein. For example, the game-logic circuitry may determine if a combination of symbols is present in the game outcome (e.g., a scatter win or payline win) is a winning outcome and presents an award sequence for any winning outcome. The game determinations may be performed in parallel with the method 100, before or after the steps of the method 100, and/or combined with the steps of the method 100. For example, an award sequence associated with the method 100 may be combined with an award sequence resulting from a different game determination.

In the example embodiment, the game-logic circuitry is configured to determine if a trigger event is present in the game outcome. The trigger event includes, for example and without limitation, the presence or absence of a certain symbol or combinations of symbols within the game outcome, random chance, meeting one or more wager or award thresholds, and combinations thereof. The trigger event may include game elements external to the symbol array or elements other than the symbols (e.g., watermarks or other modifiers applied to symbol positions). In the example embodiment, the trigger event is an accumulator symbol populating the symbol array in the game outcome. In another embodiment, the trigger event includes the symbol array being populated by one or more other trigger symbols in addition to or in place of the accumulator symbol. The accumulator symbol includes functionality for accumulating award values as described herein with respect to the method 100. In some embodiments, the accumulator symbol includes additional game functionality, such as operating as a standard symbol or wild symbol within standard symbol array games.

In the example embodiment, in response to the trigger event, game-logic circuitry is configured to activate the accumulator symbol. For trigger events that do not include the accumulator symbol, activating the accumulator symbol may include replacing one symbol within the symbol array with the accumulator symbol. The accumulator symbol has an active duration. While the accumulator symbol is active, the accumulator symbol remains within the symbol array. In some embodiments, the accumulator symbol overlaps or replaces an underlying symbol or no symbol selection is performed for the occupied symbol position such that any overlapped or replaced symbol is not considered within the game outcomes. In other embodiments, the accumulator symbol may share a symbol position with a symbol selected for a game outcome. In such embodiments, the other symbol may be used in other game outcome determinations and/or to interact with the accumulator symbol as described herein. When the duration of the accumulator symbol expires, the accumulator symbol is removed from the symbol array and/or set to an inactive state in which the accumulator symbol does not perform the functionality described herein. The accumulator symbol may be presented differently in the active and inactive states to enable the player to visually identify the state of the symbol.

The accumulator symbol is configured to accumulate award values from other symbols within the symbol array. More specifically, in the example embodiment, the available symbols for populating the symbol array include one or more value-bearing symbols. The value-bearing symbols are symbols including award indicia that visibly indicate an award associated with the respective value-bearing symbol. The award values of the value-bearing symbols may be predefined, randomly selected from a set or range of values, based on one or more game events or conditions (e.g., wager amount), and/or other suitable means of providing a plurality of award values. The award indicia may be presented with the value-bearing symbols throughout the game feature or may be hidden for a portion of the game feature. For example, the award indicia may be revealed in response to an event associated with the award value of the value-bearing symbol. In other embodiments, the accumulator symbol may be associated with additional or alternative types of symbols to accumulate award values and/or other game values (e.g., free spins, multipliers, jackpot triggers, etc.).

At step 106, the game-logic circuitry defines an award region associated with the accumulator symbol. The award region is defined to include less than all of the remaining symbol positions not occupied by the accumulator symbol. In embodiments in which other symbols may occupy the symbol position of the accumulator symbol, the award region may also include the symbol position of the accumulator symbol. In at least some embodiments, the award region is defined to include one or more symbol positions based on the position of these symbol positions relative to the symbol position occupied by the accumulator symbol.

In one example, the award region includes symbol positions adjacent to the symbol position currently occupied by the accumulator symbol (herein sometimes referred to as the "accumulator symbol position"), including the positions diagonal to the accumulator symbol position. In another example, only the adjacent symbol positions sharing an edge with the accumulator symbol position are within the award region. In a further example, the award region includes all symbol positions within the same column and row as the accumulator symbol. In yet another example, the award region includes a random set of symbol positions, where the symbol array includes one or more symbol positions external the award region. In certain embodiments, in addition to or in place of rules based on the relative position of the accumulator symbol, the award region is defined based on other characteristics (relative or otherwise) of the accumulator symbol and/or accumulator symbol position, such as matching color or indicia or a game element within the accumulator (e.g., an arrow pointing to define the award region or indicia indicating a general shape of the award region).

The rules defining the award region may remain static throughout the active duration of the accumulator symbol or may be dynamically changed through the active duration. Change of the award region rules may be in response to, for example and without limitation, each game outcome, one or more random determinations, a detected trigger event within the game outcomes, and/or player input. For example, the player may be provided the ability to change the award region. In another example, a certain symbol or symbol combination redefines the award region using different rules. In a further example, the award region is redefined to include a predefined number of symbol positions if the position of the accumulator symbol results in the award region including less than the predefined number of symbol positions. In some embodiments, the available symbols include different types of accumulator symbols, where each accumulator symbol may include different rules for defining award regions, moving through the symbol array, and/or accumulating award values as described herein.

The award region may be visually indicated to the player by the presentation assembly through one or more animations and/or presentation elements. For example, the border of the award region is highlighted and/or the symbol positions within the award region are visually distinguished from symbol positions external to the award region. The visual depiction of the award region may remain present while the accumulator symbol is active or may be hidden for a portion of the active duration. That is, the visual depiction may be present for a limited time to enable the player to identify the award region and then focus on the symbols occupying the symbol array. In other embodiments, no visual depiction is provided for the award region. In such embodiments, the award region rules may be readily understood by the player (e.g., positions adjacent the accumulator symbol position), or the hidden award region provides enhanced excitement by the player to determine where the award region is defined for a given spin.

In some embodiments, the award region may not be defined for an initial game outcome in which the accumulator symbol is activated. That is, the award region is defined for the next game outcome. In other embodiments, the award region is defined for the initial game outcome, and, at step 108, the presentation assembly updates award indicia of the accumulator symbol in response to one or more value-bearing symbols occupying the award region. More specifically, the award indicia of the accumulator symbol is updated at least partially as a function of the award indicia of the one or more value-bearing symbols within the award region. The update to the award indicia indicates a change to the underlying award value associated with the accumulator symbol. In one example, the award values of the value-bearing symbols within the award region are aggregated with any previous award value associated with the accumulator symbol. Other suitable mathematical and/or logical functions may be used to incorporate the award values of the value-bearing symbols with the accumulator symbol. In certain embodiments, rather than including the award values from the value-bearing symbols with a preexisting award value of the accumulator symbol, the preexisting award value is replaced with an award value based on the award values of the value-bearing symbols.

If there is no value-bearing symbol within the award region for a given outcome, the game-logic circuitry continues with other game outcome determinations and causes the presentation assembly to update the game interface accordingly. In some embodiments, other award events may be associated with the award region, such detecting modifier symbols within the award region. The modifier symbols are associated with respective modifiers (e.g., multipliers, jackpot triggers, etc.) that are awarded and/or applied to the accumulator symbol or other symbol in response to occupying the award region. In one example, a multiplier symbol within the award region causes the game-logic circuitry to apply a corresponding multiplier to the award value of any value-bearing symbols within the award region and/or the award value of the accumulator symbol. In another example, bonus trigger symbols or jackpot trigger symbols are collected via the award region, where collecting a threshold number of bonus or jackpot trigger symbols initiates a bonus game feature or jackpot award, respectively. In a further example, for a game feature with line pay rules, the award region may define an area that also includes rules for awarding scatter pays based on the symbols within the award region.

At step 110, the game-logic circuitry determines if the active duration of the accumulator symbol has concluded. The conclusion of the active duration may be detected, for example, by monitoring a duration counter of the accumulator symbol or detecting the accumulator symbol is occupying an end position within the symbol array. In some embodiments with a dynamic active duration, the conclusion of the active duration is based at least in part on one or more random determinations and/or game events or conditions of the game feature. In one example, a dedicated random determination is performed for one or more game outcomes to determine whether the accumulator symbol persists or is removed. In another example, the wager frequency and/or wager amount may define the active duration.

Based on the determination at step 110, if the active duration has concluded, the game-logic circuitry causes the presentation assembly to present an award sequence associated with the accumulator symbol. More specifically, at step 112, the presentation assembly presents an award indicated by the award indicia of the accumulator symbol. Additional awards, such as awards from winning combinations detected in the game outcome, may be included within the award sequence. The provided award is applied to the credit balance of the player within or at the conclusion of the award sequence. In some embodiments, the award sequence may not be immediately performed following the determination at step 110. In such embodiments, the award sequence may be at least partially delayed until a different moment of the gaming session, such as the conclusion of the bonus game feature and/or at the conclusion of the gaming session (e.g., in response to a cashout input provided by the player to the gaming machine).

At step 114, the presentation assembly removes the accumulator symbol from the symbol array. Removal of the accumulator symbol may be prior to or during the presentation of a subsequent game outcome such that the accumulator symbol is replaced in the symbol array with another symbol. In some embodiments, the accumulator symbol is visually updated to reflect the symbol has changed from an active state to an inactive state. In addition to or in place of changes to the accumulator symbol, any visual depiction of the corresponding award region may be removed or altered to visually indicate the state change to the player. In certain embodiments, the accumulator symbol may remain within the symbol array in the inactive state for one or more subsequent game outcomes.

In the example embodiment, following step 114, the game feature continues at step 102 for a subsequent game outcome. In some embodiments in which the game feature is a bonus game feature (or other game feature having limited duration), the method 100 may include an additional step prior to generating a subsequent game outcome. More specifically, in these embodiments, the method includes one or more steps for determining whether or not the game feature has concluded. For example, the game-logic circuitry may store one or more counters that monitor the duration of the game feature (e.g., number of spins or time), and the game-logic circuitry is configured to conclude the game feature in response to the counter reaching termination value, such as zero. Additionally or alternatively, the method 100 may include one or more steps to determine if a gaming session is terminated based on detecting a termination event or condition. For example, the game-logic circuitry is configured to conclude the gaming session in response to detecting a cashout input from the player. The additional steps described above may be performed prior to, during, or following the steps 114 and/or 116 as described herein.

In the example embodiment, at step 110, if the active duration of an accumulator symbol has not expired, the method 100 continues at step 116. At step 116, the presentation assembly is configured to advance the active accumulator symbol to a new symbol position within the symbol array. As the award region is based on the relative position of the accumulator symbol within the symbol array, the award region is redefined for the subsequent game outcome (i.e., at step 106). That is, the set of symbol positions defining the award region in one game outcome may not be the same set of symbol positions defining the award region in a second game outcome, through some symbol positions may be shared between the award regions of the two game outcomes. For example, if the accumulator symbol moves to an adjacent symbol position and has an award region including all adjacent symbol positions, some of the symbol positions remain in the award region while other symbol positions (particularly those in the opposite direction of the accumulator symbol movement) are not in the award region following the movement. The movement of the accumulator symbol and/or any corresponding changes to the award region and symbol array are presented through one or more animations and/or presentation elements.

The movement of the accumulator symbol through the symbol array is predefined, dynamic, or at least partially random. Predefined movement of the accumulator symbol is based on rules associated with the accumulator symbol that are stored by the game-logic circuitry. For example, the accumulator symbol may be predefined to move in one direction (e.g., left or right) through the symbol array. In another example, prior to the accumulator symbol activating at step 104, the player may be provided the ability to select a predefined movement or path from a plurality of predefined movements to be applied to at least the next activated accumulator symbol. Dynamic movement may be at least partially based on events or conditions occurring within the game feature or otherwise associated with the gaming session. In one example, the accumulator symbol moves along a payline that includes the original symbol position occupied by the accumulator symbol. In another example, other symbols that occupy the symbol array modify the path or movement of the accumulator symbol, such as a reset symbol that returns the accumulator symbol to an original symbol position or a reset position or a removal symbol that causes the accumulator symbol to be removed from symbol array. In a further example, the player may provide input to choose (or at least influence) the movement or path of the accumulator symbol. Randomized movement may be fully random, weighted random (where each potential destination is associated with a respective weight parameter), and/or partially random, where predefined or dynamic rules are also applied to movement of the accumulator symbol.

Movement of the accumulator symbol may be limited to a subset of the symbol positions within the symbol array. For example, the accumulator symbol may be configured to only move to adjacent symbol positions or symbol positions within the same row or column. In other embodiments, the movement of the accumulator symbol may be limited using other predetermined criteria, such as to symbol positions that share characteristics with the accumulator symbol and/or the occupied symbol position (e.g., background color). In some embodiments, the movement of the accumulator symbol is limited to symbol positions that have not been previously occupied by the accumulator symbol during the active duration. This limitation of movement may be explicitly defined within the stored movement rules or implicitly defined. That is, if the accumulator symbols always move left through the symbol array, no symbol position can be occupied twice by the accumulator symbol. In other embodiments, the accumulator symbol may move to any symbol position except for the symbol position occupied in the immediately prior game outcome such that the accumulator symbol can, over the course of the active duration, occupy one symbol position for more than one nonconsecutive game outcome. In certain embodiments, the movement of the accumulator symbol is not restricted such that the accumulator symbol may be configured to move to any symbol position for a given outcome, including staying in the same symbol position.

In some embodiments, the path of the accumulator symbol may be at least partially defined at or before the activation of the accumulator symbol. That is, the game-logic circuitry may be configured to determine the stop positions defining the path of the accumulator symbol before the accumulator symbol moves from an initial or original position. In embodiments in which the path is dynamically changed in response to trigger events or conditions, the game-logic circuitry may update the remaining path to reflect the dynamic changes in response to the corresponding trigger. In certain embodiments, the stop positions are predefined, but the order of the stop positions may be at least partially randomized.

In at least some embodiments, the path of the accumulator symbol defines the active duration. More specifically, the active duration ends when the accumulator symbol is moved out of the symbol array. For example, if the accumulator symbol advances one symbol position left each game outcome, the active duration is concluded when the accumulator symbol advances from a leftmost symbol position of the symbol array to an area external to symbol array. The area external to the symbol array may be presented as symbol positions distinguishable from the symbol array or as a blank area. In other examples, the accumulator symbol may not advance to an area external to the symbol array to conclude the active duration, but rather to a symbol position within the array (e.g., a central position or a position occupied by a removal symbol). In such embodiments, the active duration may be defined by the number stop positions within the path of the accumulator symbol to an end position. It is to be understood that, for embodiments in which the path of the accumulator symbol defines the active duration, the steps 110-114 may be performed following the movement at step 116 and prior to generating a subsequent game outcome.

In other embodiments, the active duration is not defined by the movement of the accumulator symbol. For example, the active duration may be defined by a period of time or number of game outcomes (or other game events) such that the accumulator symbol remains active until the active duration is concluded. In certain embodiments, the active duration may be defined with a plurality of parameters, where the active duration concludes in response to detecting one, some, or all of the parameters triggering. For example, the active duration may conclude in response to a predefined number of game outcomes or the movement of the accumulator symbol moving the accumulator symbol external to the symbol array, whichever occurs first. If the active duration is not dependent on the movement of the accumulator symbol, the game-logic circuitry may be configured to adjust or define subsequent movement of the accumulator symbol to exit the symbol array at, near, or following the conclusion of the active duration.

In some embodiments, the accumulator symbol has a symbol type and/or symbol state selected from a plurality of accumulator symbol types or states that influence the associated award region, the active duration, and/or the movement of the accumulator symbol. The type of accumulator symbol may be predefined (i.e., each accumulator symbol within the sets of available symbols has a predefined accumulator symbol type), or is selected in response to game events, such as the activation of the accumulator symbol. The state of the accumulator symbol may change in response to state triggers, such as the active duration, awards, or wagers reaching a threshold value, a random determination, the presence or absence of certain symbols in the array or award region, and/or other suitable events or conditions associated with the game feature.

The steps of the method 100 are configured to continue for subsequent game outcomes of the game feature. It is to be understood that multiple accumulator symbols may be activated within a single game outcome such that the steps of the method 100 may be repeated from each accumulator symbol. For value-bearing symbols within multiple award regions, the corresponding award values may be divided, accumulated separately as a whole, accumulated by one accumulator symbol, and/or otherwise provided to one or more accumulator symbols. The game-logic circuitry may include logic for preventing two accumulator symbols from occupying the same symbol position. In other embodiments, multiple accumulator symbols can occupy the same symbol position. In certain embodiments, if two or more accumulator symbols occupy the same symbol position, enhancements or modifiers are applied to the award values of the accumulator symbols and/or the award values of the value-bearing symbols within the award regions.

In certain embodiments, particularly embodiments in which the game feature is a bonus game feature or other game feature with limited duration, the accumulator symbol may be used to dynamically change the duration of the game feature. In one example, a predefined number of game outcomes are provided for the game feature, where each generated outcome of the game feature increments or decrements a current outcome count from an initial value to a termination value. Reaching the termination value causes the game feature to be concluded. In this example, while one or more accumulator symbols are active, the current outcome count does not change, thereby extending the duration of the game feature. Once there is no active accumulator symbol, the current outcome count once again begins counting towards the termination value for each game outcome. In another example, activating or removing the accumulator symbol changes the current outcome count (e.g., increasing the number of game outcomes for the game features). In a further example, the current outcome count continues irrespective of the presence or absence of the accumulator symbols, but if the termination value is reached while at least one accumulator symbol is active, the game feature continues until the active accumulator symbol is removed or inactivated. Other suitable means of changing the duration of the game feature based on the accumulator symbols may be used and are considered within the spirit and scope of the present disclosure.

FIGS. 4A-4J depict an example game interface of a game feature according to one or more embodiments of the present disclosure. The game interface is presented by a presentation assembly of a gaming system, such as the system shown in FIGS. 1 and 2. The presentation assembly is in communication with game-logic circuitry to perform the functions described herein. The presentation assembly and/or the game-logic circuitry may be at least partially integrated within a gaming machine. In the example embodiment, the game interface includes a symbol array 202 having fifteen symbol positions arranged into three rows and five columns. In other embodiments, the game interface includes additional or alternative presentation and game elements, including those described elsewhere herein. For example, the game interface may include additional symbol arrays, a different number of symbol positions, a different configuration of symbol positions (including symbol positions of different shapes or offsets between adjacent rows or columns), and/or the like. In some embodiments, the symbol array 202 may be dynamic such that the number of symbol positions increase and/or decrease during the game feature, such as in response to a corresponding trigger event (e.g., an array expansion symbol within an award region).

Figure 4A:
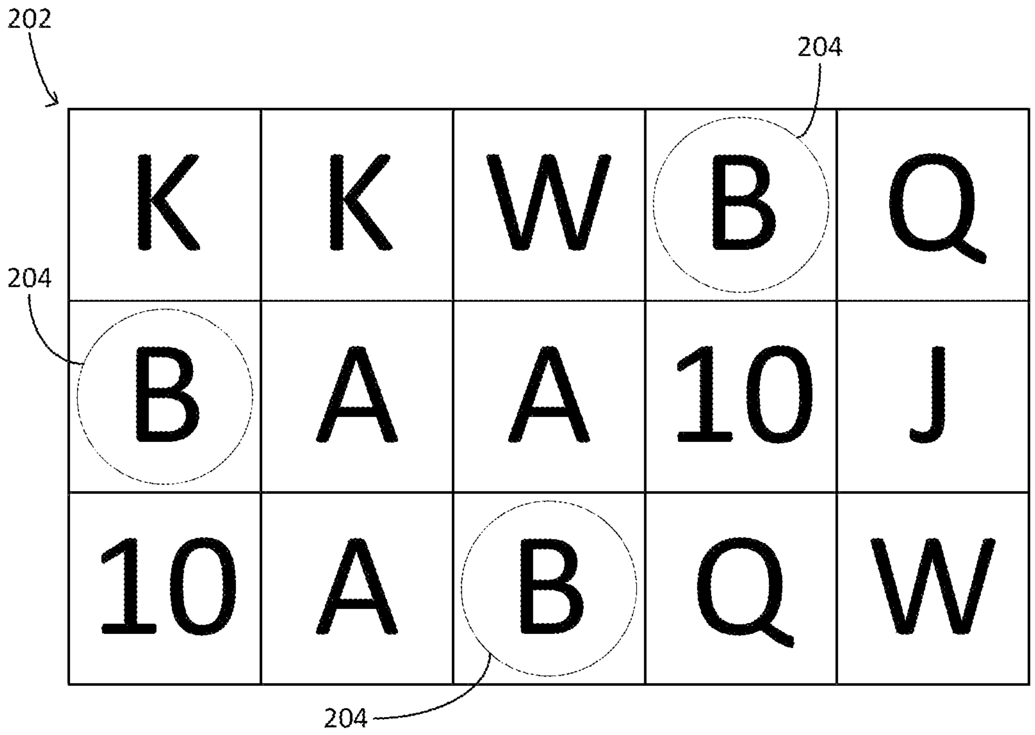
FIG. 4A is an example game interface of a game feature in a first state including a trigger event, according to an embodiment of the present invention.

FIG. 4A depicts the game interface in a first state. More specifically, in the first state, a bonus trigger event has occurred in a base game feature. In the example embodiment, game outcomes within the base game feature are presented by occupying the symbol positions of the array 202 with symbols. Additional and/or alternative suitable game outcome presentations, including partially filling the array 202 with symbol, may be used in one or more embodiments.

Figure 4B:
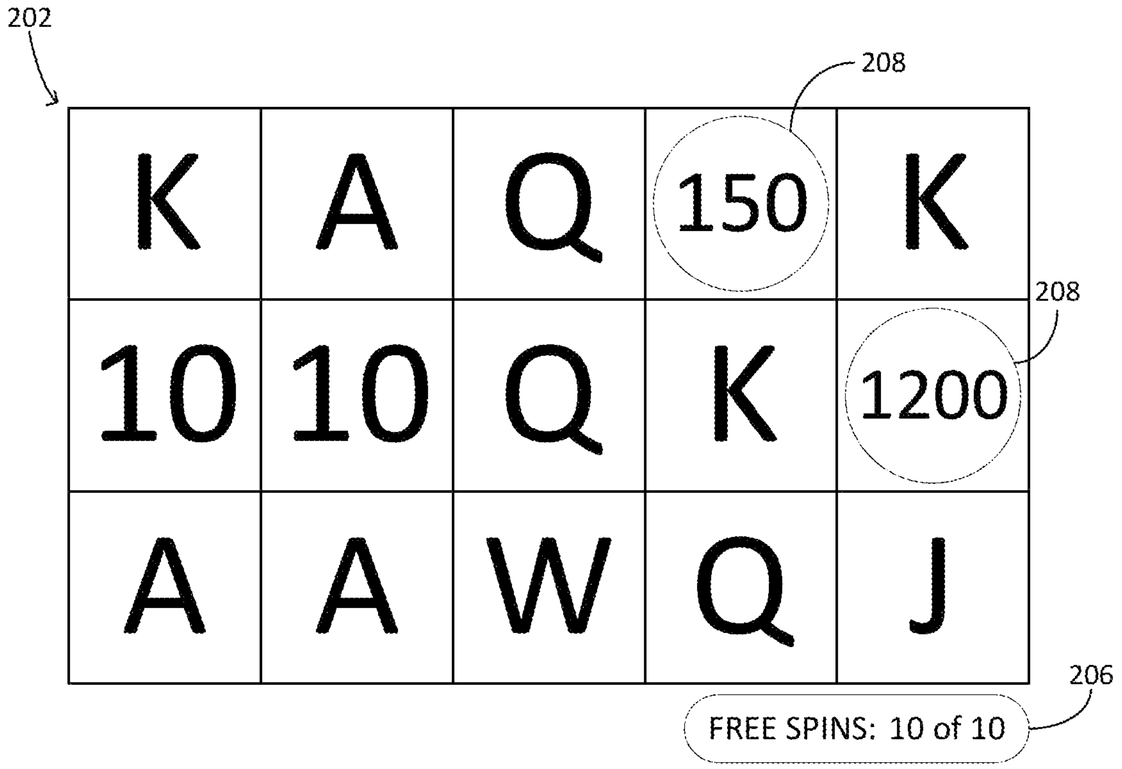
FIG. 4B is the game interface of FIG. 5A in a second state including value-bearing symbols, according to an embodiment of the present invention.

The base game outcome includes bonus symbols 204. The bonus symbols 204 are associated with one or more bonus trigger events. For example, one bonus trigger event includes the base game outcome including a number of bonus symbols 204 meeting or exceeding a threshold value. In the example embodiment, the threshold value is three, and the three bonus symbols 204 in the base game outcome trigger the bonus game feature. In other embodiments, the threshold value may be a different value (e.g., one or five). Other examples of bonus trigger events may include, for example and without limitation, collecting a predetermined amount of bonus symbols 204 over a plurality of game outcomes, detecting a winning outcome including one or more bonus symbols 204, or a bonus symbol 204 occupying a particular symbol position within the array 202. Additional or alternative conditions and events that are not directly related to the presence or absence of the bonus symbols 204 may be considered when triggering the bonus game feature. For example, the playtime of the gaming session, the wager amount or frequency of the player, player loyalty points, and the like may all be considered to determine whether or not the bonus game feature is triggered. In certain embodiments, the bonus symbols 204 may not be available within the base game feature until the other conditions or events associated with triggering the bonus game feature are satisfied, FIG. 4B depicts the game interface in a second state. In the second state, the presentation assembly is presenting a first game outcome of the bonus game feature. In addition to the symbol array 202, the game interface includes a spin meter 206. The spin meter 206 tracks the number of spins or game outcomes within the bonus game feature. That is, the bonus game feature has a limited duration, and the spin meter 206 is configured to track the number of spins performed and/or remaining within the bonus game feature. In the example embodiment, the initial duration of the bonus game feature is ten spins or game outcomes. In other embodiments, the initial duration of the bonus game feature may include more or less spins. The duration may be static through the game feature or dynamic as described herein. It is to be understood that the duration of the bonus game feature may be defined using additional or alternative parameters, such as time, award amount, number of game events other than spins, and the like. The spin meter 206 may be altered to adapt to the specific configuration of the duration and/or additional or alternative meters are presented on the game interface to track the duration. In the example embodiment, the in response to determining the duration is concluded, the bonus game feature is terminated, and the game interface returns to the base game feature shown in FIG. 4A or another suitable game feature.

Similar to the base game feature, the symbol array 202 is populated by symbols randomly selected from one or more sets of available symbols (e.g., reel strips associated with one or more respective symbol positions) in the bonus game feature. The game-logic circuitry is configured to generate the game outcomes or spins and perform one or more outcome determinations, and the presentation assembly updates the game interface accordingly using one or more presentation elements and/or animations. In the example embodiment, the second state includes two value-bearing symbols 208. The value-bearing symbols 208 are symbols including award indicia that visually indicates an award value associated with the respective symbol 208. In the illustrated example, one value-bearing symbol 208 is associated with an award value of ‘150’ while the other value-bearing symbol 208 is associated with an award value of ‘1200’.

One method of collecting the award values of the value-bearing symbols 208 is described herein. The game logic may also be configured to provide additional means of collecting the award values of the value-bearing symbols 208. For example, an award symbol occupying the symbol array 202 may cause all value-bearing symbols 208 in the array 202 to be awarded. In another example, the value-bearing symbols 208 may be included within a winning combination of symbols. The value-bearing symbols 208 may be limited to the functions described herein or include additional functionality. For example, the value-bearing symbols 208 may also operate as wild symbols (“W” as shown in FIG. 4B), standard symbols (e.g., "A," "K," "Q," "J," and "10"), and/or other suitable symbol types.

Figure 4C:
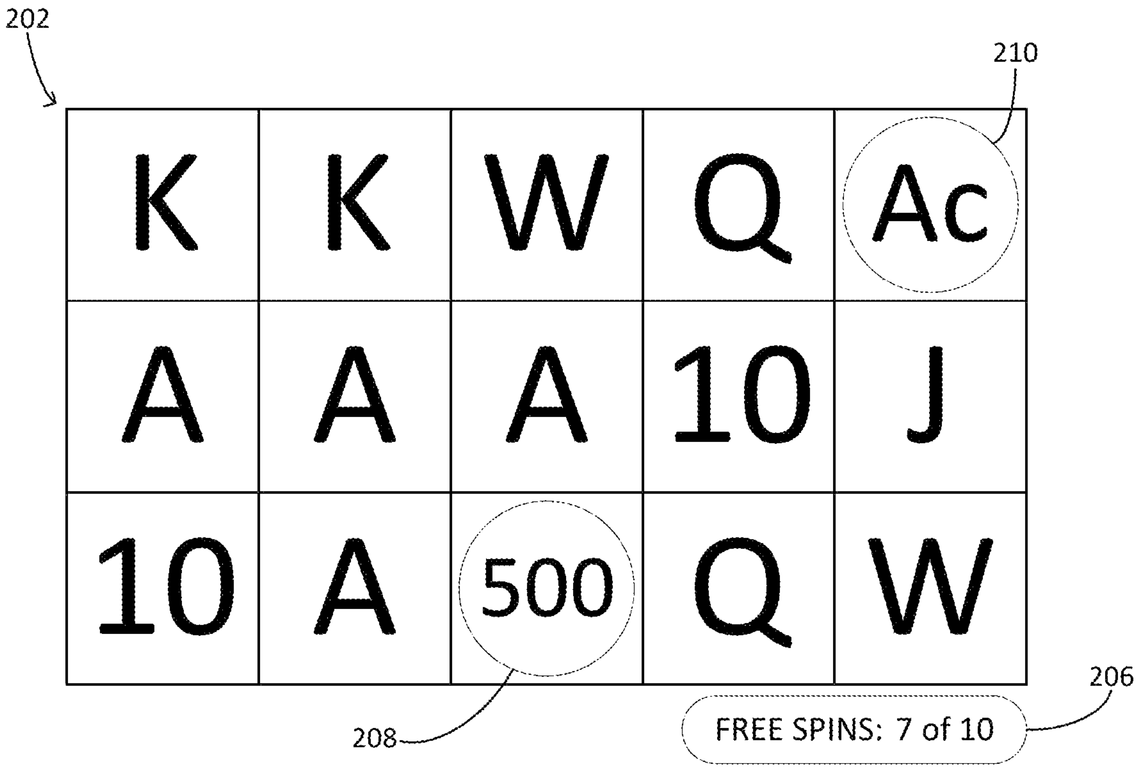
FIG. 4C is the game interface of FIG. 5A in a third state including an activated accumulator symbol, according to an embodiment of the present invention.

FIG. 4C depicts the game interface in a third state subsequent to the second state. More specifically, the third state includes a bonus game outcome several spins after the outcome shown in the second state as indicated by the change in the spin meter 206. In the third state, an activation event is detected based on the symbols within the array 202. In the example embodiment, the activation event includes detecting an accumulator symbol 210 in the symbol array 202. In other embodiments, additional or alternative activation events may be detectable within the bonus game feature. Examples of activation events include, and without limitation, initiating the bonus game feature, detecting one or more activation symbols (not shown), detecting a particular combination of symbols, and the like.

The accumulator symbol 210 is configured to persist within the symbol array 202 when active. That is, the accumulator symbol 210 has an active duration (defined by time, number of spins, and/or other suitable game events or conditions) during which the accumulator symbol 210 persists within the outcomes of the game feature. When the active duration has expired the accumulator symbol 210 is removed from the array 202 and/or inactivated, where the features associated with the accumulator symbol 210 as described herein as limited or otherwise removed for inactive accumulator symbols 210. Multiple accumulator symbols 210 may be active simultaneously within the symbol array 202 for a given game outcome. Each activation event may activate a respective accumulator symbol 210 or one activation event may activate multiple accumulator symbols 210 at once. For multiple active accumulator symbols 210, the symbols 210 may have respective active durations or share the same active duration.

The accumulator symbol 210 is configured to accumulate award values or otherwise trigger awards. In the example embodiment, the accumulator symbol 210 is configured to accumulate award values from value-bearing symbols 208 based on logic defining an award region within the symbol array 202. The award region includes one or more symbol positions of the symbol array 202. In the example embodiment, the award region includes less than all of the symbol positions within symbol array 202. In some embodiments, the award region is statically defined through the active duration of the accumulator symbol 210. In other embodiments, the award region is dynamically defined in response to changes associated with the game feature throughout the active duration of the game feature. In the example embodiment, as described herein, the award region is defined based on a relative position of the accumulator symbol 210 within the symbol array 202, and the accumulator symbol 210 is configured to move throughout the symbol array 202 between game outcomes such that the award region is redefined based on each move of the accumulator symbol. In other embodiments, other suitable means of redefining the award region may be used, such as, and without limitation, based on the other symbols occupying the symbol array 202, characteristics of the symbol positions (e.g., background color, etc.), game elements external to the symbol array 202, and/or the like. In certain embodiments, in addition to or in place of accumulating or triggering awards, the accumulator symbol 210 and the award region may be used to trigger other game functions or effects, such as collecting jackpot trigger symbols (not shown), applying wild symbols to the array 202, and the like.

Figure 4D:
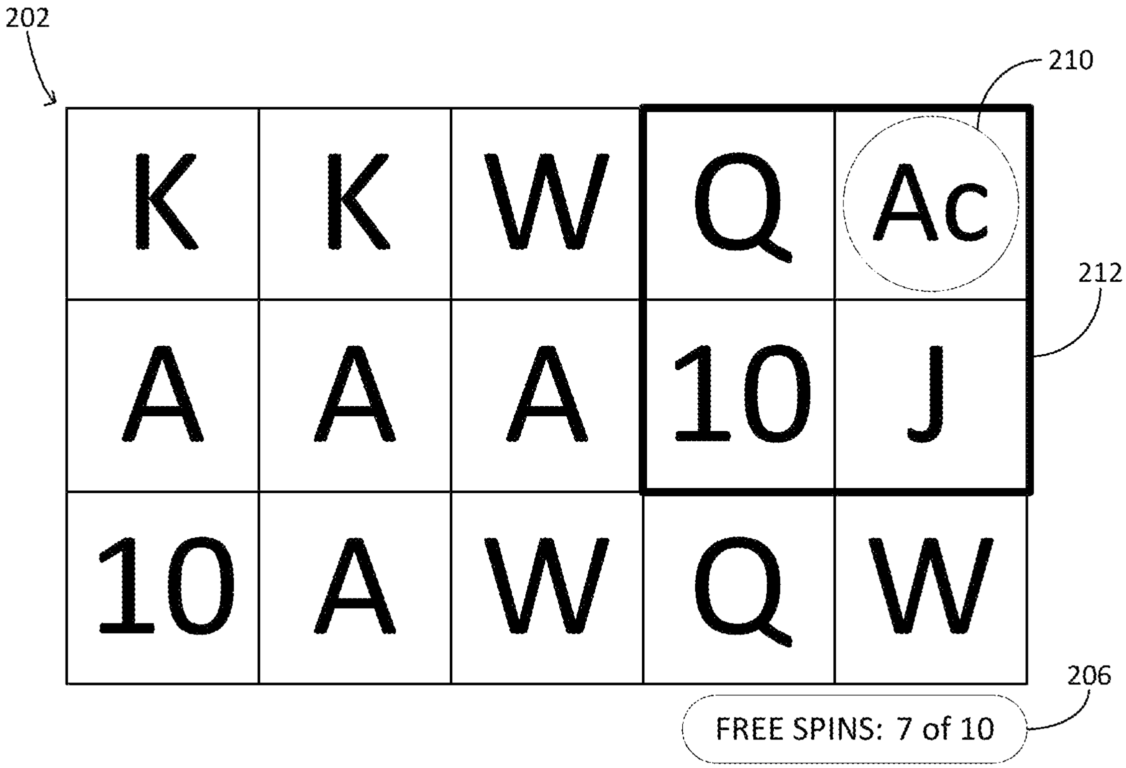
FIG. 4D is the game interface of FIG. 5A in a fourth state including an award region associated with an accumulator symbol, according to an embodiment of the present invention.

FIG. 4D depicts the game interface in a fourth state associated with the third state. In the fourth state, an example award region is defined as indicated in FIG. 4D by a bold border 212 for the accumulator symbol 210. That is, in the example embodiment, the award region 212 is defined to include any symbol position adjacent to the symbol position of the accumulator symbol 210 (also known as the "accumulator symbol position"), including any diagonally adjacent positions. Other suitable rules for defining the award region 212 may be used, including those described elsewhere herein. The rules defining the award region 212 may be based on the symbol type of the accumulator symbol 210 (where multiple types of accumulator symbols are available) and/or alter between game outcomes.

The award region 212 may be visually depicted to the player on the game interface for at least a portion of the game feature through one or more presentation elements and/or animations. For example, the award region 212 may be displayed in response to defining or redefining the award region 212 for a period of time before being hidden. In another example, the award region 212 remains visible throughout the game feature. In certain embodiments, particularly those with readily understood award region rules, the award region 212 may not be visually defined.

In the fourth state, three symbol positions are adjacent to the accumulator symbol position and within the award region 212. As the accumulator symbol position shares two edges with the border of the symbol array 202, the number of symbol positions within the award region 212 is less than a maximum number of positions according to the rules of the award region 212. In certain embodiments, additional symbol positions may be added to the symbol array to fully populate the award region 212. In one example, the additional symbol positions are added only within the award region. In another example, additional rows and/or columns are added to the symbol array 202. These additional symbol positions may persist through the bonus game feature and/or the active duration of the accumulator symbol or be removed in response to any changes to the award region.

In the fourth state, the game-logic circuitry determines that there are no value-bearing symbols within the award region 212, and therefore no award is to be provided or accumulated based on the award region 212. Other game determinations, such as detecting other winning outcomes, are performed based on the fourth state. The presentation assembly is configured to update the game interface in response to these game determinations as necessary. For example, if a winning outcome is detected based on line or scatter paytables, the presentation assembly is configured to present an award sequence to provide an award corresponding to the winning outcome.

In the example embodiment, in addition to the award region 212, the accumulator symbol 210 is configured to impact the duration of the bonus game feature. More specifically, while one or more accumulator symbols are active, the spin meter 206 remains the same value. That is, for each game outcome without an accumulator symbol, the spin meter 206 increments or decrements towards a termination value, and, for each game outcome with an active accumulator symbol, the spin meter 206 remains the same value, thereby extending the duration of the bonus game feature. Other suitable game feature duration changes may be made in response to the accumulator symbol 210, such as providing a predefined number of additional spins or increasing the rate at which the spin meter 206 proceeds to the termination value (i.e., to conclude the bonus game feature faster). These changes may be in response to the activation of the accumulator symbol 210 and/or other events or conditions of the symbol 210, including those described elsewhere herein. In one example, the available symbols for the bonus game feature include symbols that increase or decrease the duration of the game feature, where landing these symbols within the award region 212 changes the duration of the bonus game feature. In other embodiments, the presence or absence of the accumulator symbol 210 has no impact on the spin meter 206 and/or the duration of the bonus game feature.

Figure 4E:
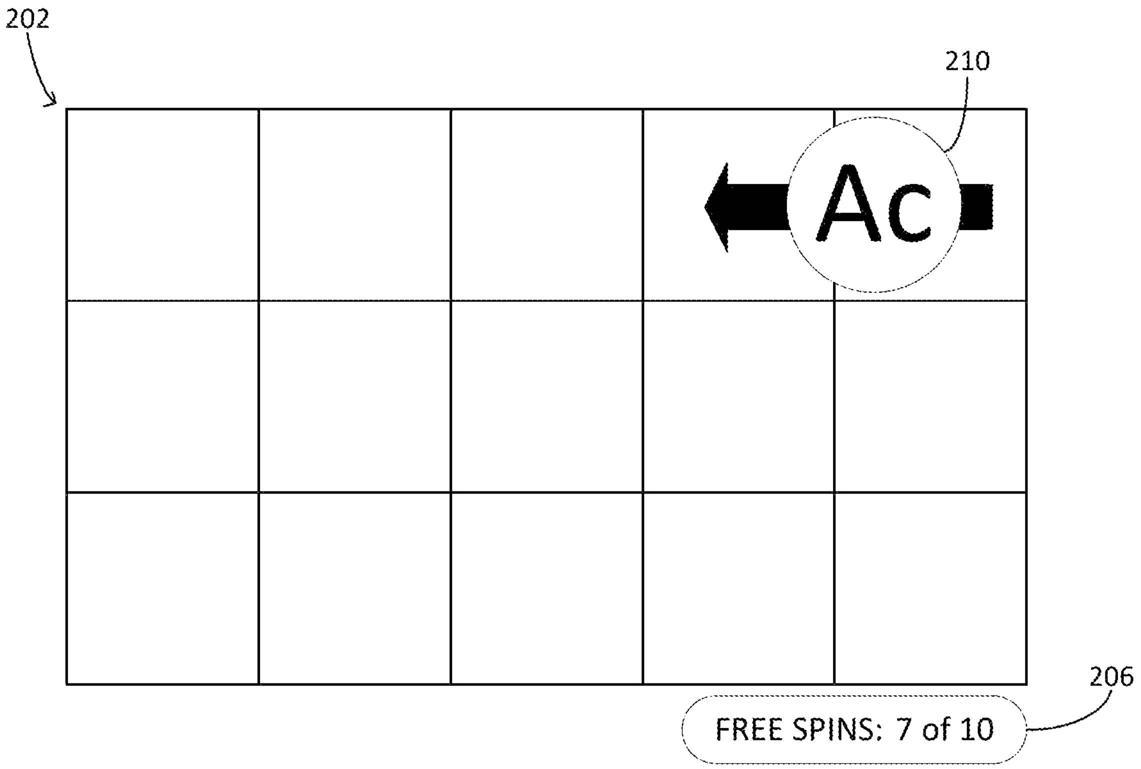
FIG. 4E is the game interface of FIG. 5A in a fifth state including an accumulator symbol moving through a symbol array, according to an embodiment of the present invention.

In the example embodiment, between game outcomes of the bonus game feature, the accumulator symbol 210 is configured to move between symbol positions such that the award region 212 is redefined based on the new position of the symbol 210 within the array 202. FIG. 4E depicts the game interface in a fifth state following the fourth state. In the fifth state, the accumulator symbol 210 is animated to move one position left of the previous accumulator symbol position. In some embodiments, the movement of the accumulator symbol 210 is predefined. In one example, the accumulator symbol 210 moves according to a predefined path selected from a plurality of predefined paths, where the selection of the predefined path is random and/or based on characteristics of the accumulator symbol 210, such as starting position, symbol type, and the like. In other embodiments, the movement is random or partially dynamic in response to events or conditions of the bonus game feature. For example, certain starting symbol positions, symbols, awards, and/or wager characteristics may impact the movement of the accumulator symbol 210. In certain embodiments, the starting, ending, and/or one or more intermediate positions of the accumulator symbol 210 are predetermined, and the path through the predefined positions and any additional stopping positions is random and/or dynamically determined.

The game interface is updated by the presentation assembly to visually indicate the movement of the accumulator symbol 210. The movement of the accumulator symbol 210 may be conveyed to the player through one or more animations and/or updates to the presentation elements. In FIG. 4E, the other symbols have been removed from the array 202 to indicate the movement is occurring between game outcomes (i.e., during the animation generating the subsequent game outcome). It is to be understood that the movement of the accumulator symbol 210 may occur before, during, or after any intermediate animation between game outcomes, such as a spin animation that removes the symbols from the last outcome and stops on the symbols forming the next game outcome.

Figure 4F:
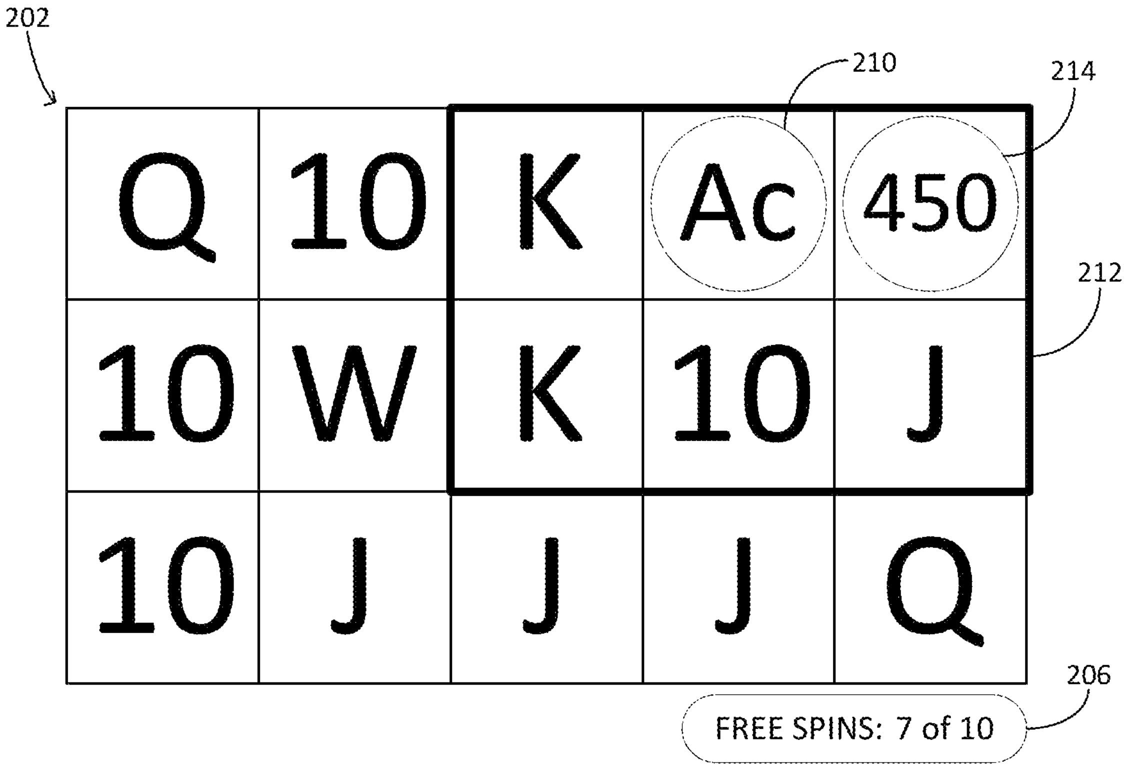
FIG. 4F is the game interface of FIG. 5A in a sixth state including a value-bearing symbol within an award region, according to an embodiment of the present invention.

FIG. 4F depicts the game interface in a sixth state following the fifth state. In the sixth state, a second game outcome is presented with the accumulator symbol 210 in a new symbol position. In the example embodiment, in response to the positional change of the accumulator symbol 210, the award region 212 is updated or redefined based on the new position of the accumulator symbol 210. In comparing FIGS. 4D and 4F, the award region 212 in the sixth state includes new symbol positions in the middle column of the array 202 and symbol positions from the award region 212 in the fourth state. The overlap between award regions 212 for different game outcomes is at least partially dependent upon the current position of the accumulator symbol 210 within the array 202 and the logic defining the award region 212 such that the award region 212 may include all, none, or some of the symbol positions from a previous award region 212. The award region 212 may also include the same, additional, or fewer symbol positions relative to a previous award region 212. The new award region 212 may be visually depicted to the player through one or more animations and/or presentation elements (e.g., a visual border) to indicate the changes to the player.

The award region 212 is considered to include the accumulator symbol position. In some embodiments, the accumulator symbol position can be occupied by other symbols in addition to the accumulator symbol 210. In other embodiments, the award region 212 does not include the accumulator symbol position. In such embodiments, the award region 212 does not include one other symbol position of the array 202 beyond the accumulator symbol position such that value-bearing symbols can land external to the award region 212 on a given game outcome.

In the sixth state, a value-bearing symbol 214 has populated the award region 212. In the illustrated embodiment, the award indicia of the value-bearing symbol 214 indicates a corresponding credit award (i.e., a credit award of 450 credits). The game-logic circuitry detects the value-bearing symbol 214 within the award region 212 and causes the presentation assembly to initiate a collection sequence. In the example embodiment, the collection sequence includes accumulating the award value of value-bearing symbol 214 with the accumulator symbol 210. In other embodiments, the collection event causes the award value of the value-bearing symbol 214 to be applied or awarded to the credit balance and/or other meter such that the award values are not stored by the accumulator symbol 210. For any non-award value collection (e.g., free spins, wild symbols, jackpot trigger symbols etc.), the collection may be stored similar to the credit awards and/or applied to the game interface for one or more game outcomes. For example, the spin meter 206 may be updated to include additional free spins, or wild symbols are applied to the next game outcome of the bonus game feature. The non-award value collection may be in response to detecting value-bearing symbols and/or other special symbols (or combinations of symbols) within the award region 212. The collection events are presented by the presentation assembly through one or more animations and/or changes to presentation elements of the game interface.

Figure 4G:
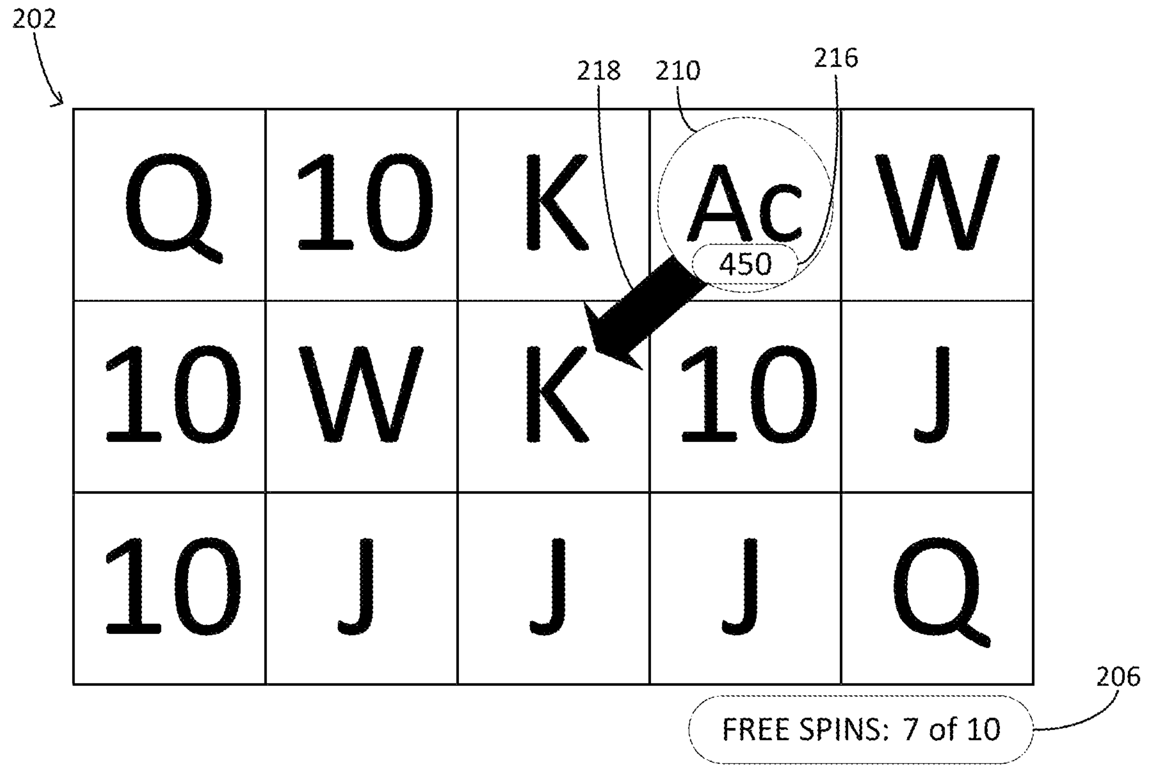
FIG. 4G is the game interface of FIG. 5A in a seventh state including an accumulator symbol storing an accumulated award value and moving, according to an embodiment of the present invention.

FIG. 4G depicts a seventh state following the sixth state. In the seventh state, the collection sequence for the value-bearing symbol 214 has been completed. More specifically, the value indicated by the value-bearing symbol 214 has been accumulated by the accumulator symbol 210 as indicated by award indicia 216 presented within the symbol 210. Additional or alternative presentations and/or storage of the accumulated values may be used in other embodiments. In certain embodiments, the award indicia 216 may be temporarily presented responsive to changes to the award value of the accumulator symbol 210.

The value-bearing symbol 214 has been removed to visually indicate the value of the symbol 214 has been incorporated with the accumulator symbol 210. The removal of the value-bearing symbol 214 may be performed through one or more suitable animations. In some embodiments, the value-bearing symbol 214 is replaced with another symbol, and one or more game determinations may include the replacement symbol (e.g., determining line pays or scatter pays). In other embodiments, the value-bearing symbol 214 is not replaced or the value-bearing symbol 214 may remain in the array 202 until the next game outcome presentation. For embodiments in which the removed value-bearing symbol 214 is not replaced, the symbol position may be left blank. For embodiments in which the value-bearing symbol 214 remains in the array 202, the presentation of the value-bearing symbol 214 may be updated to reflect the collection sequence. In one example, the award indicia is removed from the value-bearing symbol 214. In another example, the value-bearing symbol 214 is greyed out or dimmed to indicate the functions associated with the symbol 214 have been performed. It is to be understood that other suitable visual depictions of the value-bearing symbol 214 and the corresponding functionality are considered within the spirit and scope of the present disclosure and may be used to adapt the functions described herein to a particular application and/or theme.

In the example embodiment, the award indicia 216 matches the value of the value-bearing symbol 214 because the accumulator symbol 210 had a prior award value of zero. In some embodiments, the accumulator symbol 210 has an initial award value greater than zero such that the award value of the award indicia 216 is the aggregated award value of the collected award values and the initial award value. In certain embodiments, the award indicia 216 may not present the total aggregated award, but rather presents the aggregated award collected in the current game outcome. In other embodiments, other suitable mathematical and/or logical operations may be performed based on the values of value-bearing symbols within the award region and/or any award value associated with the accumulator symbol 210. In one example, rather than adding the values together, the accumulator symbol 210 is configured to compare a stored award value to one or more award values of the value-bearing symbols within the award region 212 on a given game outcome and store the greater award value based on the comparison.

In addition to the changes to the award indicia 216, the movement of the accumulator symbol 210 for a third game outcome is depicted by arrow 218. The movement may be the same between each game outcome (e.g., the accumulator symbol moves left one position every outcome), or the movement may be different. In the illustrated embodiment, rather than move one position left, the accumulator symbol 210 moves diagonally one position to the center of the array 202. In some embodiments, the number of destinations for an accumulator symbol may be restricted to less than all of the symbol positions within the array 202. For example, the accumulator symbol 210 may be associated with movement logic that restrains movement to only adjacent symbol positions.

In at least some embodiments, the movement of the accumulator symbol 210 is restricted to prevent the accumulator symbol 210 from moving to at least the accumulator symbol position from an immediately prior game outcome. In the illustrated example, such a movement restriction would prevent the accumulator symbol 210 from moving back to the accumulator symbol position shown in FIGS. 4C and 4D. In certain embodiments, for each accumulator symbol 210, each symbol position may be occupied by the accumulator symbol 210 no more than a predefined number of times (e.g., once). In embodiments with movement restrictions, the restrictions may be removed or reset in response to certain events or conditions. In one example, a reset event (e.g., detecting a reset symbol in the award region 212) may cause the accumulator symbol 210 to return to the original accumulator symbol position or other reset position and reset any movement restrictions. In other embodiments, the accumulator symbols may move throughout the array 202 without restriction, including maintaining the same accumulator symbol position for a plurality of game outcomes.

Figure 4H:
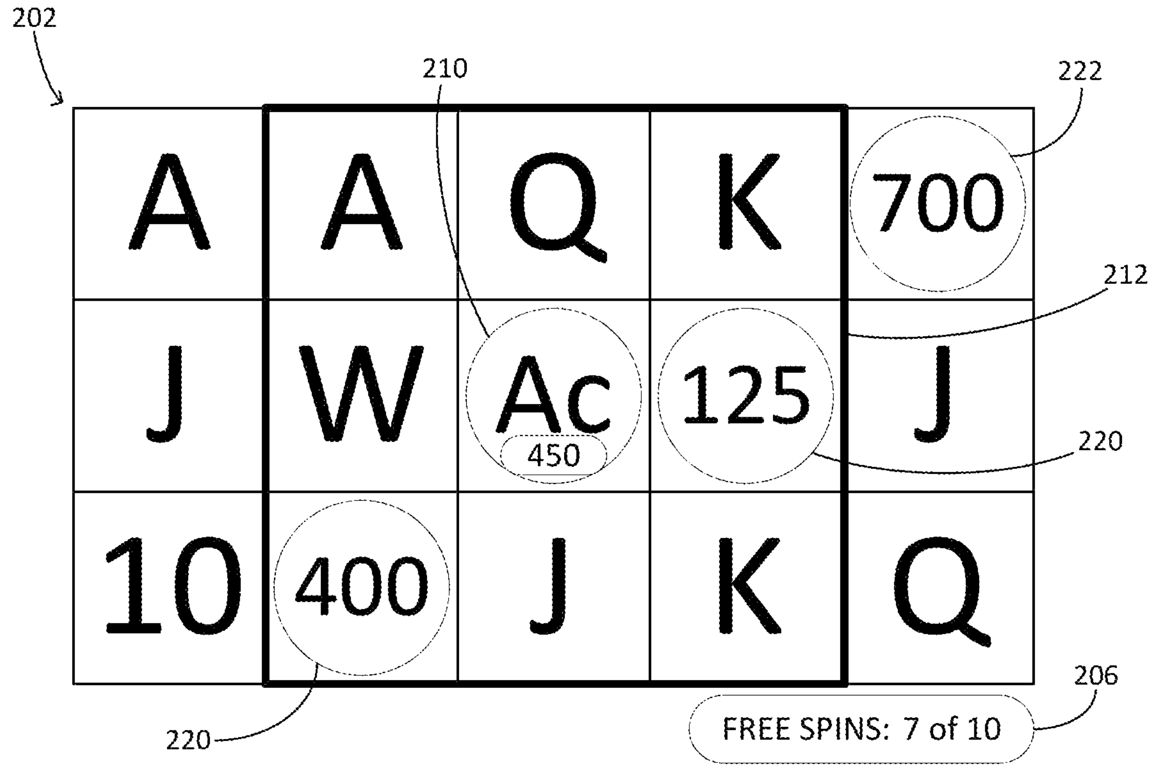
FIG. 4H is the game interface of FIG. 5A in an eighth state including an award region updated in response to movement of an accumulator symbol, according to an embodiment of the present invention.

FIG. 4H depicts the game interface in an eighth state following the seventh state. In the eighth state, a fourth game outcome is presented with the accumulator symbol 210 locked in a new symbol position. Accordingly, the award region 212 is redefined based on the new accumulator symbol position. The fourth game outcome includes two value-bearing symbols 220 within the award region 212 and one value-bearing symbol 222 outside of the award region 212. Accordingly, the game-logic circuitry causes the presentation assembly to initiate a collection sequence for the two value-bearing symbols 220 within the award region 212 and not the external value-bearing symbol 222.

Figure 4I:
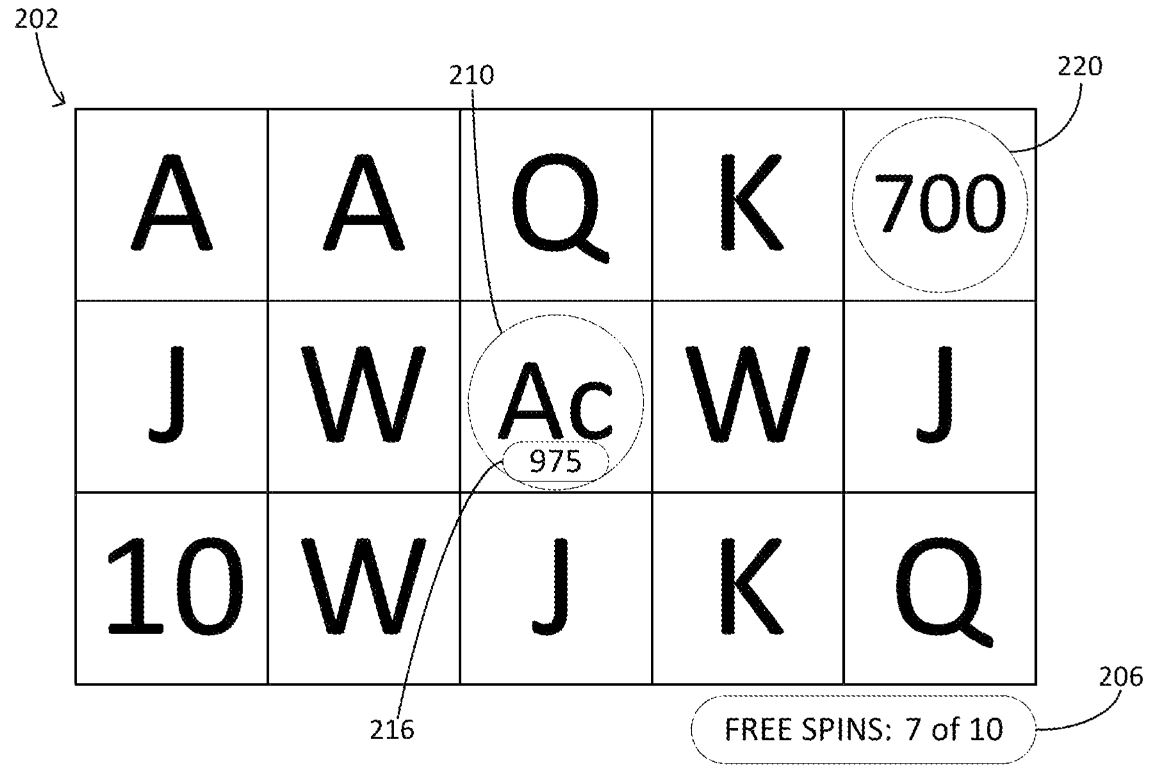
FIG. 4I is the game interface of FIG. 5A in a ninth state including an accumulator symbol storing award values within the award region without accumulating award values external to the award region, according to an embodiment of the present invention.

In the example embodiment, the award values indicated by the value-bearing symbols 220 are collected by the accumulator symbol 210 and aggregated with any preexisting award value of the symbol 210. FIG. 4I depicts the game interface in a ninth state following the eighth state. In the ninth state, the accumulated values from the value-bearing symbols 220 (i.e., a credit value of 525) is aggregated with the preexisting value of the accumulator symbol to result in a credit value of 975. The award indicia 216 is updated by the presentation assembly to reflect the change in award value.

In the ninth state, the awarded value-bearing symbols 220 have been removed similar to the value-bearing symbol 214, and the external value-bearing symbol 222 remains in the array 202 to visually indicate to the player that the external value-bearing symbol 222 has not been awarded or accumulated via the accumulator symbol 210. In some embodiments, despite the external value-bearing symbol 222 not being included within the collection sequence, the presentation assembly may change the appearance of the symbol 222 in response to the collection sequence.

Figure 4J:
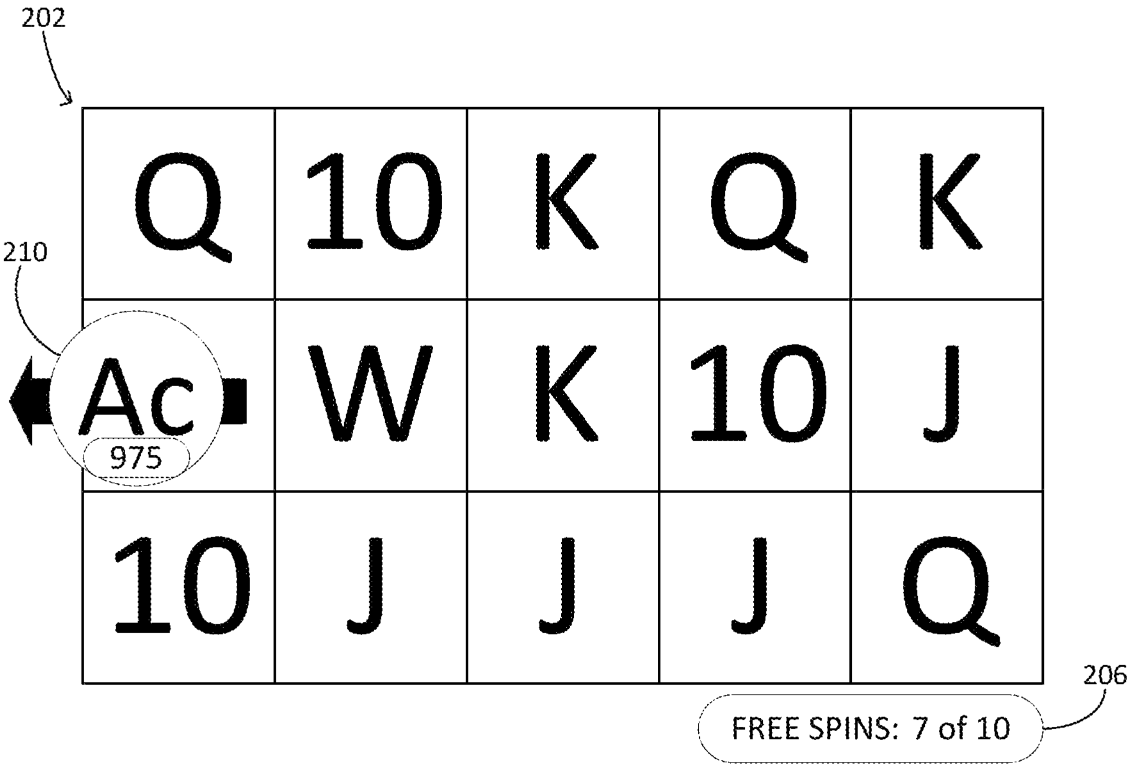
FIG. 4J is the game interface of FIG. 5A in a tenth state including an accumulator symbol being removed from a symbol array, according to an embodiment of the present invention.

FIG. 4J depicts the game interface in a tenth state following the ninth state. In the tenth state, the active duration of the accumulator symbol has expired. Accordingly, the accumulator symbol 210 is removed from the array 202. In the example embodiment, the accumulator symbol 210 is animated to move out of the array 202. In response to removing the accumulator symbol 210, the award value indicated by the award indicia 216 is provided via an award sequence. The award sequence may include adding the indicated award value to the credit balance of the player. In certain embodiments, particularly those in which the awards and/or other collected game elements (e.g., spins, wild symbols etc.) are provided immediately rather than collected by the accumulator symbol 210, the removal of the accumulator symbol 210 is not accompanied by an award sequence. It is to be understood that the removal of the accumulator symbol 210 and/or the award sequence may be presented using any suitable configuration of animations and/or presentation elements to visually convey the game events to the player, including those described elsewhere herein.

In some embodiments, the active duration of the accumulator symbol 210 is based on the removal of the symbol 210, which may be predefined (due to predefined movement of the symbol 210) or dynamic such that the movement of the accumulator symbol 210 can be determined to remove the symbol 210 from the array 202 during the game outcomes. In other embodiments, the movements of the accumulator symbol 210 may be at least partially predefined such that the accumulator symbol 210 moves to a predefined position (or one of a plurality of predefined end positions) to facilitate the removal animations of the accumulator symbol 210 from the array 202.

FIGS. SA-5D depict an example game interface associated with a game feature similar to the game feature shown in FIGS. 4A-4). That is, the game interface is presented by a presentation assembly of a gaming machine in communication with game-logic circuitry of a gaming system (such as the system shown in FIGS. 1 and 2). The game interface includes a symbol array 302 and a spin meter 306. The game feature is configured to include an accumulator symbol 310 associated with an award region 312.

Figure 5A:
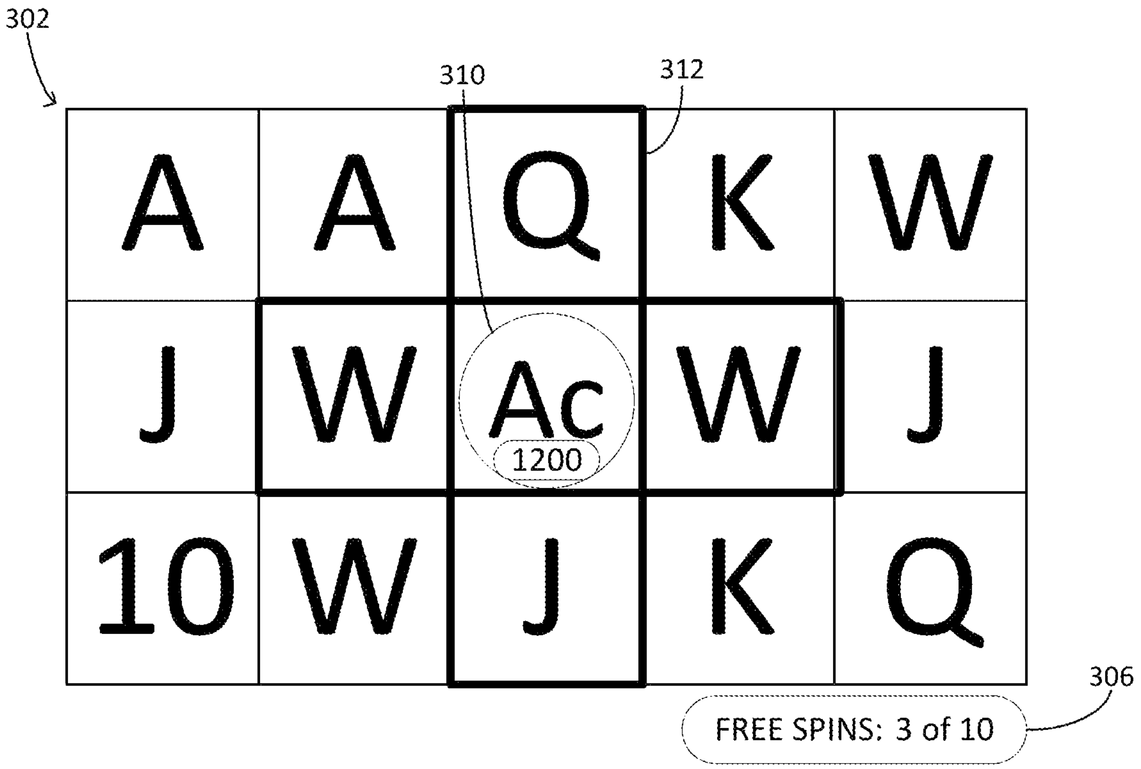
FIG. 5A is an example game interface of a game feature including a first type of award region, according to an embodiment of the present invention.
Figure 5B:
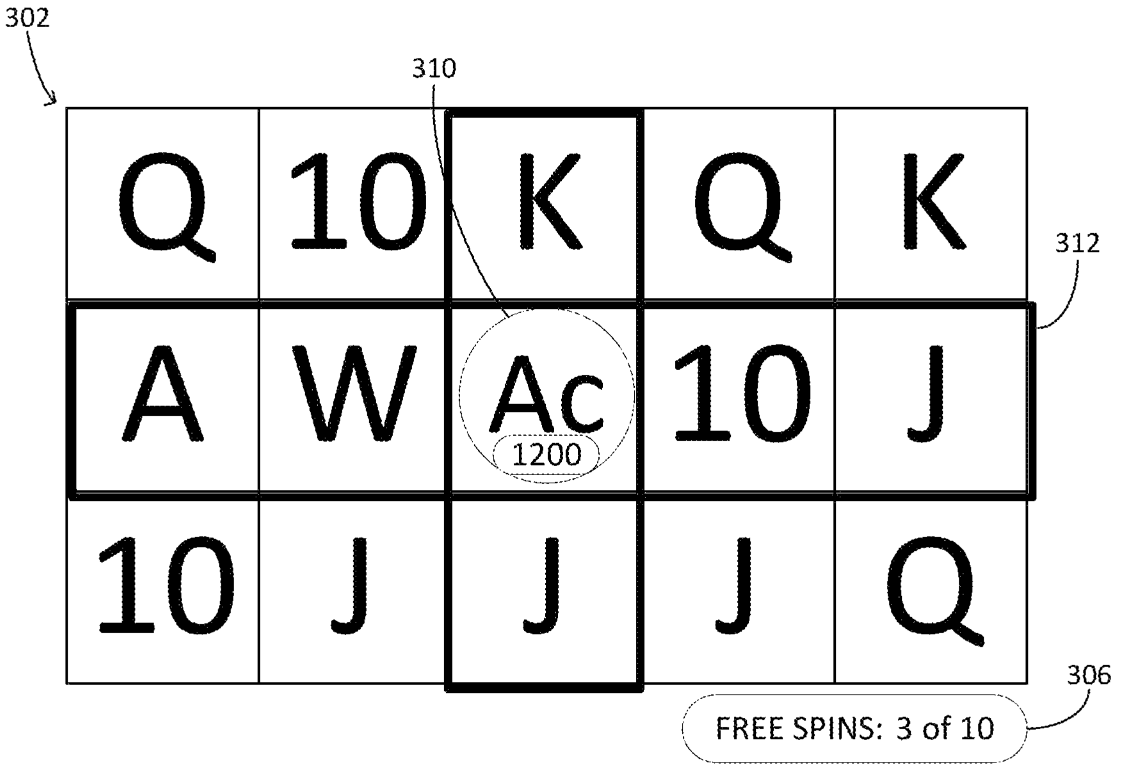
FIG. 5B is an example game interface of a game feature including a second type of award region, according to an embodiment of the present invention.
Figure 5C:
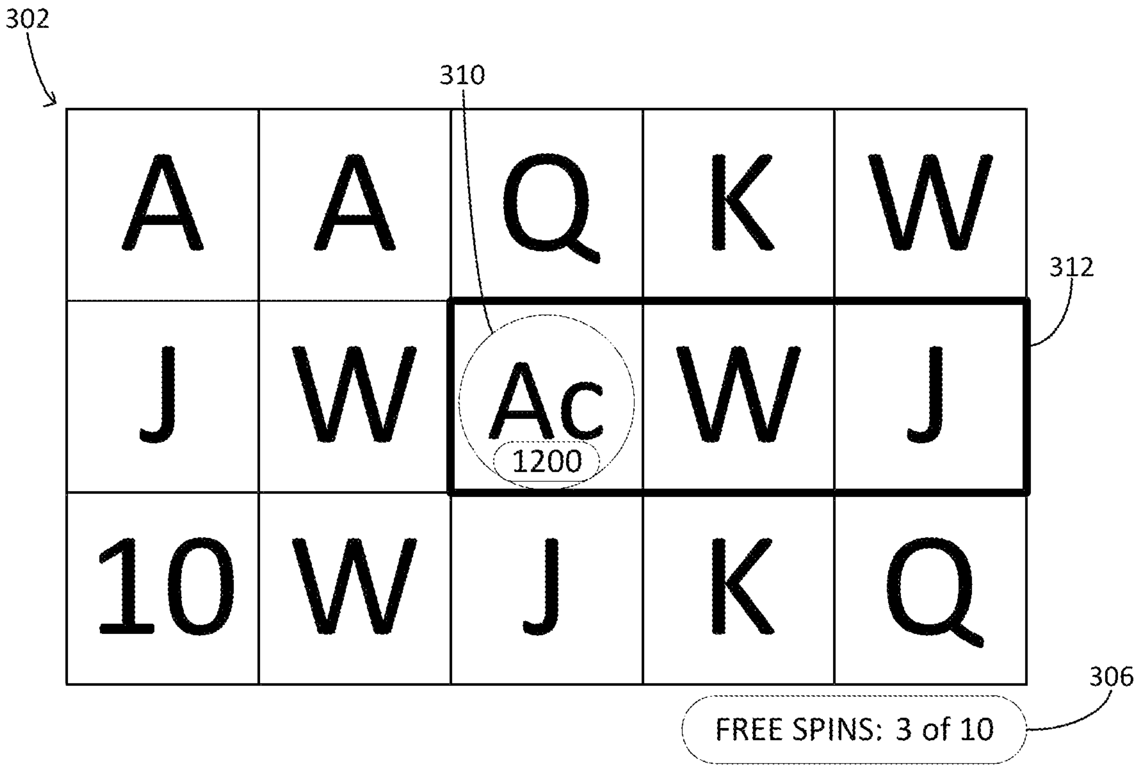
FIG. 5C is an example game interface of a game feature including a third type of award region, according to an embodiment of the present invention.
Figure 5D:
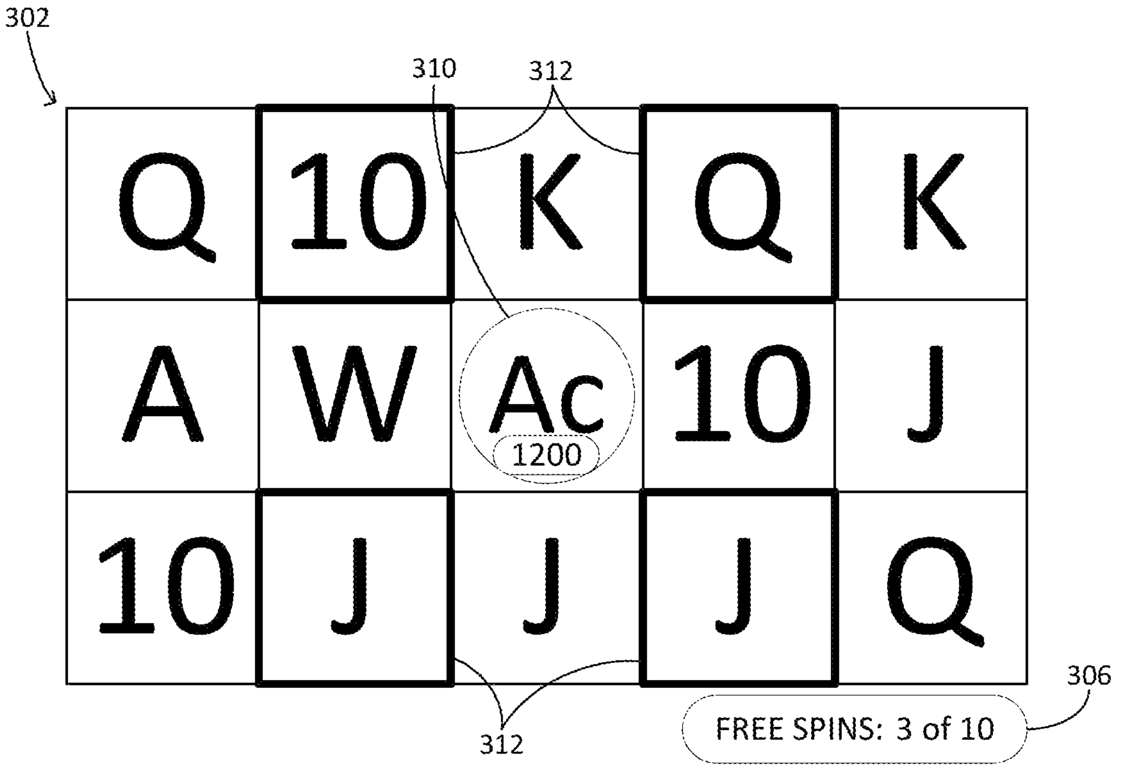
FIG. 5D is an example game interface of a game feature including a fourth type of award region, according to an embodiment of the present invention.

FIGS. 5A-5D depict different types of award regions 312 associated with the accumulator symbol 310. More specifically, FIG. 5A depicts an award region 312 including symbol positions sharing an edge with the accumulator symbol position, FIG. 5B depicts an award region 312 including symbol positions within the same row or column as the accumulator symbol position, FIG. 5C depicts an award region 312 including symbol positions previously and currently occupied by the accumulator symbol 310, and FIG. 5D depicts an award region including symbol positions diagonal from the accumulator symbol position. Other suitable positional relationships with the accumulator symbol position (including historical and future accumulator symbol positions) may be used to define additional or alternative award regions 312. In certain embodiments, at least some award regions may not be positionally related, but rather are defined through a different relationship with the accumulator symbol 310 and/or the accumulator symbol position. The type of award region 312 may be associated with the type of accumulator symbol, characteristics of the accumulator symbol position, the bonus game outcome, a random determination, a game event or condition associated with the accumulator symbol 310, and/or other suitable aspects of the game feature. In one example, the available symbols for the game feature includes accumulator symbols of a plurality of symbol types, where each type has a respective award region type.

Figure 6:
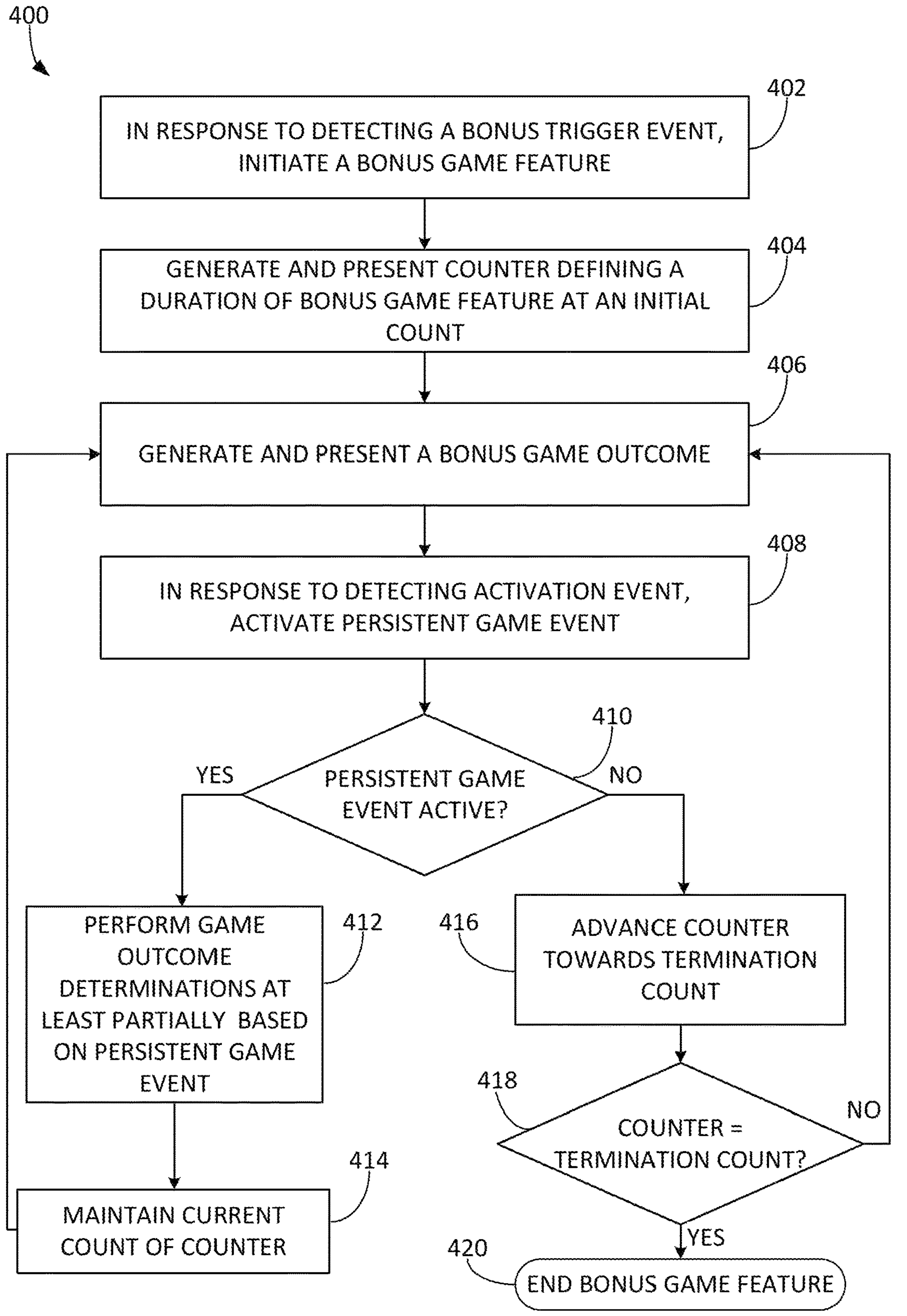
FIG. 6 is a flow diagram of an example method for conducting and presenting a game feature having a dynamic game duration using a gaming system, according to one embodiment of the present invention.

FIG. 6 depicts a flow diagram of an example method 400 for conducting and presenting a bonus game feature with a dynamic duration using a gaming system (e.g., the gaming system shown in FIGS. 1 and 2). The method 400 is at least partially performed by game-logic circuitry of the gaming system and a presentation assembly of a gaming machine and in communication with the game-logic circuitry. In addition to the example embodiments described herein, it is to be understood that the method 400 may include additional, fewer, or alternative steps and/or may be performed by at least partially by other suitable devices, including those steps and other devices described herein (e.g., a remote server).

The method 400 may be used in combination with a game feature the same as or similar to the game features described with respect to FIGS. 3-5D. That is, an accumulator symbol is activated within a symbol array and affects the duration of the game feature. However, the method 400 is not limited to these functions, but may also be used for other game features including other selectively activated game elements and/or game events to impact the duration of the game feature.

The method 400 begins at step 402, where, in response to a bonus trigger event detected by the game-logic circuitry, a bonus game feature is initiated. Although referred to herein as a "bonus game feature," it is to be understood that the game feature associated with the method 400 may be any other type of game feature that has a limited duration as described herein. The presentation of the game feature is updated to reflect the change in the presented game feature, though at least some game elements may remain the same between game features (e.g., the symbol array remains).

At step 404, the game-logic circuitry generates and stores a duration counter for the bonus game feature at an initial count. The duration counter is configured to monitor the duration of the game feature based on the progress from the initial count towards a termination count. For example, the initial count may be ten and the termination count is zero, and the game-logic circuitry is configured to decrement the duration counter from the initial count in response to game outcomes and/or other game events as described herein. The relationship between the initial count and the termination count may be predefined to determine whether the counter is incremented or decremented as described herein. In at least some embodiments, the presentation assembly is configured to display one or more presentation elements depicts the current count of the duration counter and/or the progress towards the termination count.

At step 406, the game-logic circuitry is configured to generate a game outcome of the bonus game feature and cause the presentation assembly to present the game outcome. In generating the game outcome, the game-logic circuitry is configured to perform any predefined analysis or determinations on the symbols or other game elements composing the game outcome to identify any game events or conditions. If a game event according to the logic of the bonus game feature is identified, a corresponding response and presentation to the game event is provided by the game-logic circuitry and presentation assembly, respectively.

At step 408, if an activation event is detected within the game outcome, the game-logic circuitry is configured to activate a persistent game event. The persistent game event includes one or more game elements and/or game logic that is not present in the bonus game feature while no persistent game event is active. The persistent game event is configured to persist for a plurality of game outcomes. The active duration of the persistent game event may be predefined, at least partially random, or dynamically determined responsive to game events within the game outcomes of the bonus game feature. In one example, the persistent game event includes an accumulator symbol or other symbol that impacts one or more game determinations (e.g., by adding an award region for accumulating award values). In another example, the persistent game event includes game logic that indicates any value-bearing symbols occupying the symbol array are to be awarded during the active duration, where the value-bearing symbols are otherwise awarded on through limited rules, not awarded at all, or not present in bonus game outcomes without the persistent game event.

At step 410, the game-logic circuitry is configured to determine if one or more persistent game events are active for the bonus game outcome. It is to be understood that steps 408 and 410 may occur serially or in parallel with each other such that the persistent game event activated in the current bonus game outcome may be detected during the step 410 of the current outcome or the next outcome. If a persistent game outcome is active, the game-logic circuitry proceeds to step 412. At step 412, the game-logic circuitry performs any additional or modified game determinations for the current game outcome based at least partially on the active persistent game event. For example, if an accumulator symbol is active, the game-logic circuitry is configured to define an award region and determine if any awards are to be collected based on the award region. In another example, a modifier symbol increases the value of certain symbols or replaces symbols with special or high-value symbols. The presentation assembly is configured to update the game interface of the bonus game feature to reflect these game determinations and any resulting actions, such as initiating an award sequence. At step 414, the game-logic circuitry maintains the duration counter at its current count, and the presentation assembly may be configured to reflect this lack of change visually to indicate the extended duration of the bonus game feature to the player. In other embodiments, if a persistent game event is active or activated, other suitable changes to the duration counter are made at step 414, such as resetting the current count, increasing or decreasing the count, changing the termination count, and the like. These changes may be clearly and visually indicated to the player via the presentation assembly.

Following steps 412 and 414, the game-logic circuitry generates a subsequent game outcome at step 406. In addition to the steps 412 and 414, the game-logic circuitry may also determine whether or not an active persistent game event should be removed from the bonus game feature. That is, the game-logic circuitry determines if a termination event or condition associated with the persistent game event is detected (e.g., the active duration of the event has concluded) and removes the persistent game event if the termination event is detected. The removal of the persistent game event may include removing game elements, presentation elements, and/or animations associated with the persistent game event from the game interface. In certain embodiments, rather than removing the persistent game event, the persistent game event is set to an inactive state suspend game logic and/or presentation associated with the persistent game event until another activation event is detected.

If no persistent game event is determined to be active at step 410, then the game-logic circuitry is configured to proceed with any game determinations according to the game logic of the bonus game feature, such as identifying any winning outcomes and the like. Following the game outcome determinations, the game-logic circuitry updates the duration counter at step 416 to advance towards the termination count. That is, if the termination count is zero and the current count is ten, the current count is decremented in response to the game outcome. In another example, if the termination count is ten and the current count is zero, the current count is incremented towards the termination count. The increment or decrement of the current count may be in response to additional or alternative events or conditions, such as game outcomes with certain conditions present or absent. The change to the current count is conveyed to the player by updating the one or more presentation elements associated with the current count via the presentation assembly.

At step 418, the game-logic circuitry determines whether or not the current count of the duration counter has met the termination count. If the current count does not equal the current count, the bonus game feature continues at step 406 with another bonus game outcome, thereby repeating the subsequent steps of the method 400. If the current count does equal the termination count, the duration of the bonus game feature has concluded, and the bonus game feature is concluded at step 420. Concluding the bonus game feature may cause another game feature to be initiated (or resumed), or concluding the bonus game feature may conclude the corresponding gaming session. Concluding the bonus game feature may include the presentation assembly presenting a concluding sequence to visually indicate the end of the bonus game feature and/or a summary of the events or awards from the bonus game feature.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols and/or accumulator symbols may not be associated with awards outside of the features described herein. In other embodiments, the value-bearing symbols and/or accumulator symbols may be included within line pays, scatter pays, and/or other suitable awards. For example, the value-bearing symbols may be treated as a special symbol, such as a wild symbol.

The embodiments of the present invention provide an innovative procedure for animating roaming accumulator symbols and collecting values of symbols in a symbol array based on the accumulator symbols. Game-logic circuitry executing instructions in accordance with the embodiments present a visual display of spinning reels with clearly enumerated symbology that combine in readily understood arrangements to increase in value and/or move throughout the symbol array. An observer experiences excitement and anticipation as new symbols land in the array, values within a dynamic award region are collected by the accumulator symbols, and an award sequence associated with the accumulator symbol is initiated to award the collected award values. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are collected and selected from the award elements.

The symbol-movement and value-collection procedure may be symbol- and game-agnostic. Themes and imagery of symbols and environment may be varied with no effect on the value-award process. Or, if so desired, the criteria for value-award may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple collection of number values and a random selection from the collected values. The embodiments disclosed herein represents a win-win: simpler, almost self-explanatory graphics combined with faster, more efficient processing. The inventive value-award procedure can be implemented on the vast majority of casino gaming machines without requiring upgrades or modifications.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a gaming machine with a presentation assembly configured to present a graphical game interface including a plurality of symbol positions selectively populated by symbols from one or more sets of available symbols, the one or more sets of available symbols including value-bearing symbols with award indicia visually indicating an associated award value; and game-logic circuitry in communication with the presentation assembly, the game-logic circuitry configured to:

cause the presentation assembly to present, via the graphical game interface, a plurality of game outcomes, each outcome of the plurality of game outcomes including animations populating the plurality of symbol positions with a respective plurality of symbols according to one or more outputs of a continuously cycling random number generator of the game-logic circuitry;

in response to a trigger event associated with a first game outcome of the plurality of game outcomes, cause the presentation assembly to present an activation animation for an accumulator symbol at a first symbol position of the plurality of symbol positions, the accumulator symbol having an active duration, wherein the accumulator symbol remains presented within the plurality of symbol positions and defines an award region within the plurality of symbol positions relative to a current position of the accumulator symbol while the accumulator symbol is active, the award region including less than all of the plurality of symbol positions;

for each of the subsequent game outcomes, cause the presentation assembly to present an animation advancing the accumulator symbol to a next symbol position of the plurality of symbol positions different from a previous symbol position of the plurality of symbol positions occupied by the accumulator symbol in an immediately prior game outcome, wherein the award region is redefined based on the next symbol position;

in response to a value-bearing symbol occupying the award region, cause the presentation assembly to visually update award indicia of the accumulator symbol at least partially as a function of the award value associated with the value-bearing symbol; and in response to the active duration concluding, cause the presentation assembly to animate, via the graphical game interface, removal of the accumulator symbol from the plurality of symbol positions and present an award sequence for an award indicated by the award indicia of the accumulator symbol.

2. The gaming system of claim 1, wherein the trigger event includes the first symbol position being occupied by the accumulator symbol within the first game outcome.

3. The gaming system of claim 1, wherein the accumulator symbol moves through the plurality of symbol positions along a predefined path, the predefined path defining the active duration.

4. The gaming system of claim 1, wherein the accumulator symbol moves at least partially at random through the plurality of symbol positions.

5. The gaming system of claim 1, wherein the active duration is dynamically updated in response to duration events increasing or decreasing the active duration.

6. The gaming system of claim 1, wherein the plurality of game outcomes occurs within a free spins game feature, and wherein game outcomes with the accumulator symbol active do not reduce a remaining number of free spins within the free spins game feature.

7. The gaming system of claim 1, wherein the award region is limited to symbol positions adjacent to a symbol position currently occupied by the accumulator symbol.

8. A method for conducting and presenting a game feature using a gaming system including a presentation assembly of a gaming machine and game-logic circuitry in communication with the presentation assembly, the method comprising:

presenting, by the presentation assembly, a graphical game interface including a plurality of symbol positions selectively populated by symbols from one or more sets of available symbols, the one or more sets of available symbols including value-bearing symbols with award indicia visually indicating an associated award value;

presenting, by the presentation assembly via the graphical game interface, a plurality of game outcomes, each outcome of the plurality of game outcomes including animations populating the plurality of symbol positions with a respective plurality of symbols according to one or more outputs of a continuously cycling random number generator of the game-logic circuitry;

in response to a trigger event associated with a first game outcome of the plurality of game outcomes, causing, by the game-logic circuitry, the presentation assembly to present an activation animation for an accumulator symbol at a first symbol position of the plurality of symbol positions, wherein the accumulator symbol having an active duration, wherein the accumulator symbol remains presented within the plurality of symbol positions and defines an award region within the plurality of symbol positions relative to a current position of the accumulator symbol while the accumulator symbol is active, the award region including less than all of the plurality of symbol positions;

for each of the subsequent game outcomes, presenting, by the presentation assembly, an animation advancing the accumulator symbol to a next symbol position of the plurality of symbol positions different from a previous symbol position of the plurality of symbol positions occupied by the accumulator symbol in an immediately prior game outcome, wherein the award region is redefined based on the next symbol position;

in response to a value-bearing symbol occupying the award region, visually updating, by the presentation assembly, award indicia of the accumulator symbol at least partially as a function of the award value associated with the value-bearing symbol; and in response to the active duration concluding, animating, by the presentation assembly via the graphical game interface, removal of the accumulator symbol from the plurality of symbol positions and presenting, by the presentation assembly, an award sequence for an award indicated by the award indicia of the accumulator symbol.

9. The method of claim 8, wherein the trigger event includes the first symbol position being occupied by the accumulator symbol within the first game outcome.

10. The method of claim 8, wherein the accumulator symbol moves through the plurality of symbol positions along a predefined path, the predefined path defining the active duration.

11. The method of claim 8, wherein the accumulator symbol moves at least partially at random through the plurality of symbol positions.

12. The method of claim 8, wherein the active duration is defined by a number of game outcomes.

13. The method of claim 8, wherein the plurality of game outcomes occurs within a free spins game feature, and wherein game outcomes with the accumulator symbol active do not reduce a remaining number of free spins within the free spins game feature.

14. The method of claim 8, wherein the first symbol position is unoccupied by the accumulator symbol on a second game outcome following the first game outcome, and wherein the first symbol position is available to be occupied by the accumulator symbol subsequent to the second game outcome.

15. A gaming machine comprising:

a presentation assembly configured to present a graphical game interface including a plurality of symbol positions selectively populated by symbols from one or more sets of available symbols, the one or more sets of available symbols including value-bearing symbols with award indicia visually indicating an associated award value; and game-logic circuitry in communication with the presentation assembly, the game-logic circuitry configured to:

cause the presentation assembly to present, via the graphical game interface, a plurality of game outcomes, each outcome of the plurality of game outcomes including animations populating the plurality of symbol positions with a respective plurality of symbols according to one or more outputs of a continuously cycling random number generator of the game-logic circuitry;

in response to a trigger event associated with a first game outcome of the plurality of game outcomes, cause the presentation assembly to present an activation animation for an accumulator symbol at a first symbol position of the plurality of symbol positions, the accumulator symbol having an active duration, wherein the accumulator symbol remains presented within the plurality of symbol positions and defines an award region within the plurality of symbol positions relative to a current position of the accumulator symbol while the accumulator symbol is active, the award region including less than all of the plurality of symbol positions;

for each of the subsequent game outcomes, cause the presentation assembly to present an animation advancing the accumulator symbol to a next symbol position of the plurality of symbol positions different from a previous symbol position of the plurality of symbol positions occupied by the accumulator symbol in an immediately prior game outcome, wherein the award region is redefined based on the next symbol position;

in response to a value-bearing symbol occupying the award region, cause the presentation assembly to visually update award indicia of the accumulator symbol at least partially as a function of the award value associated with the value-bearing symbol; and in response to the active duration concluding, cause the presentation assembly to animate, via the graphical game interface, removal of the accumulator symbol from the plurality of symbol positions and present an award sequence for an award indicated by the award indicia of the accumulator symbol.

16. The gaming machine of claim 15, wherein the trigger event includes the first symbol position being occupied by the accumulator symbol within the first game outcome.

17. The gaming machine of claim 15, wherein the accumulator symbol moves at least partially at random through the plurality of symbol positions.

18. The gaming machine of claim 15, wherein the plurality of game outcomes occurs within a free spins game feature, and wherein game outcomes with the accumulator symbol active do not reduce a remaining number of free spins within the free spins game feature.

19. The gaming machine of claim 15, wherein the award region is limited to symbol positions adjacent to a symbol position currently occupied by the accumulator symbol.

20. The gaming machine of claim 15, wherein the active duration is defined by a number of game outcomes.

21. The gaming machine of claim 15, wherein the first symbol position is unoccupied by the accumulator symbol on a second game outcome following the first game outcome, and wherein the first symbol position is available to be occupied by the accumulator symbol subsequent to the second game outcome.

* * * * *